(12) United States Patent
Xi et al.

(10) Patent No.: US 9,918,079 B2
(45) Date of Patent: Mar. 13, 2018

(54) ELECTRONIC DEVICE AND MOTION COMPENSATION METHOD

(71) Applicant: Intel Corporation, Santa Clara, CA (US)

(72) Inventors: Yinglai Xi, Beijing (CN); Qiang Li, Beijing (CN); Zhichong Chen, Beijing (CN); Jumei Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 686 days.

(21) Appl. No.: 13/888,635

(22) Filed: May 7, 2013

(65) Prior Publication Data

US 2013/0301701 A1 Nov. 14, 2013

(30) Foreign Application Priority Data

May 8, 2012 (CN) .......................... 2012 1 0140262

(51) Int. Cl.
*H04N 19/43* (2014.01)
*H04N 19/105* (2014.01)
(Continued)

(52) U.S. Cl.
CPC ....... *H04N 19/00024* (2013.01); *H04N 19/43* (2014.11); *H04N 19/44* (2014.11); *H04N 19/523* (2014.11); *H04N 19/80* (2014.11)

(58) Field of Classification Search
None
See application file for complete search history.

(56) References Cited

U.S. PATENT DOCUMENTS 6,301,299 B1 * 10/2001 Sita .......................... G09G 5/39
348/714
6,466,624 B1 * 10/2002 Fogg ....................... H04N 19/46
375/240.12
(Continued)

FOREIGN PATENT DOCUMENTS

JP 2011050001 A * 3/2011
TW 201129099 8/2011

OTHER PUBLICATIONS

English language translation of abstract of TW 201129099 (published Aug. 16, 2011).

*Primary Examiner* — William C Vaughn, Jr.
*Assistant Examiner* — Stuart Bennett
(74) *Attorney, Agent, or Firm* — Schiff Hardin LLP

(57) ABSTRACT

An electronic device for motion compensation is provided. The electronic device has a processing unit configured to perform a decoding program on a video bitstream to output decoding data, wherein the decoding data has a plurality of inter-prediction macroblocks, and the processing unit further generates a plurality of first pixel interpolation values according to the inter-prediction macroblocks which are smaller than a predetermined macroblock size. A motion compensation acceleration circuit is configured to generate a plurality of second pixel interpolation values according to the inter-prediction macroblocks which are larger than or equal to the predetermined macroblocks size, and generate a plurality of reconstructed macroblocks according to the first pixel interpolation values, the second pixel interpolation values, and a plurality of corresponding residue values.

20 Claims, 25 Drawing Sheets

(51) Int. Cl.
*H04N 19/44* (2014.01)
*H04N 19/80* (2014.01)
*H04N 19/523* (2014.01)

(56) References Cited

U.S. PATENT DOCUMENTS

| | | | |
|---|---|---|---|
| 2012/0147963 A1* | 6/2012 | Sato | H04N 19/176 375/240.16 |
| 2012/0147967 A1* | 6/2012 | Panchal | H04N 19/197 375/240.17 |
| 2013/0156096 A1* | 6/2013 | Yang | H04N 19/176 375/240.02 |

* cited by examiner

ELECTRONIC DEVICE AND MOTION COMPENSATION METHOD

CROSS REFERENCE TO RELATED APPLICATIONS

This Application claims priority of China Patent Application No. 201210140262.9, filed on May 8, 2012, the entirety of which is incorporated by reference herein.

BACKGROUND OF THE INVENTION

Field of the Invention

The present invention relates to video processing, and in particular, relates to a video decoding system incorporated with a motion compensation hardware acceleration circuit using hardware and software means.

Description of the Related Art

Video compression standards, such as the H.264 standard or the VC-1 standard, have been widely used in commercial video coding/decoding systems. Further, video decoding systems can comprise hardware only or software only systems. Since variable macroblock size motion compensation is adapted in the H.264 and VC-1 standards, it's very difficult to control irregular data flow for decoding a bitstream by hardware only. Accordingly, there is high complexity to design a motion compensation circuit conforming to each size of macroblocks. As for decoding a bitstream by software only, since the size of the macroblocks vary, it's not efficient to decode the bitstream by only using a CPU. If only a CPU is used, the CPU will be burdened when decoding a bitstream with high definition; especially for a CPU operating with a low frequency and low power.

BRIEF SUMMARY OF THE INVENTION

In view of the above, an electronic device for motion compensation is provided in the invention. The electronic device may perform motion compensation by utilizing software and hardware (e.g. a motion compensation acceleration circuit) simultaneously, thereby reducing the design complexity of the motion compensation acceleration circuit without increasing significant burden for a CPU. A detailed description is given in the following embodiments with reference to the accompanying drawings.

In an exemplary embodiment, an electronic device for motion compensation is provided. The electronic device comprises a processing unit configured to perform a decoding program on a video bitstream to output decoding data, wherein the decoding data comprises a plurality of inter-prediction macroblocks, and the processing unit further generates a plurality of first pixel interpolation values according to the inter-prediction macroblocks which are smaller than a predetermined macroblock size; and a motion compensation acceleration circuit, configured to generate a plurality of second pixel interpolation values according to the inter-prediction macroblocks which are larger than or equal to the predetermined macroblocks size, and generate a plurality of reconstructed macroblocks according to the first pixel interpolation values, the second pixel interpolation values, and a plurality of corresponding residue values.

In another exemplary embodiment, a motion compensation method applied in an electronic device is provided. The electronic device comprises a processing unit and a motion compensation acceleration circuit. The motion compensation method comprises the following steps of: performing a decoding program on a video bitstream to output decoding data by the processing unit, wherein the decoding data comprises a plurality of inter-prediction macroblocks; generating a plurality of first pixel interpolation values according to the inter-prediction macroblocks which are smaller than a predetermined macroblock size by the processing unit; generating a plurality of second pixel interpolation values according to the inter-prediction macroblocks which are larger than or equal to the predetermined macroblock size by the motion compensation acceleration circuit; and generating a plurality of reconstructed macroblocks according to the first pixel interpolation values, the second pixel interpolation values and a plurality of corresponding residue values by the motion compensation acceleration circuit.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

A. System Architecture

Figure 1:
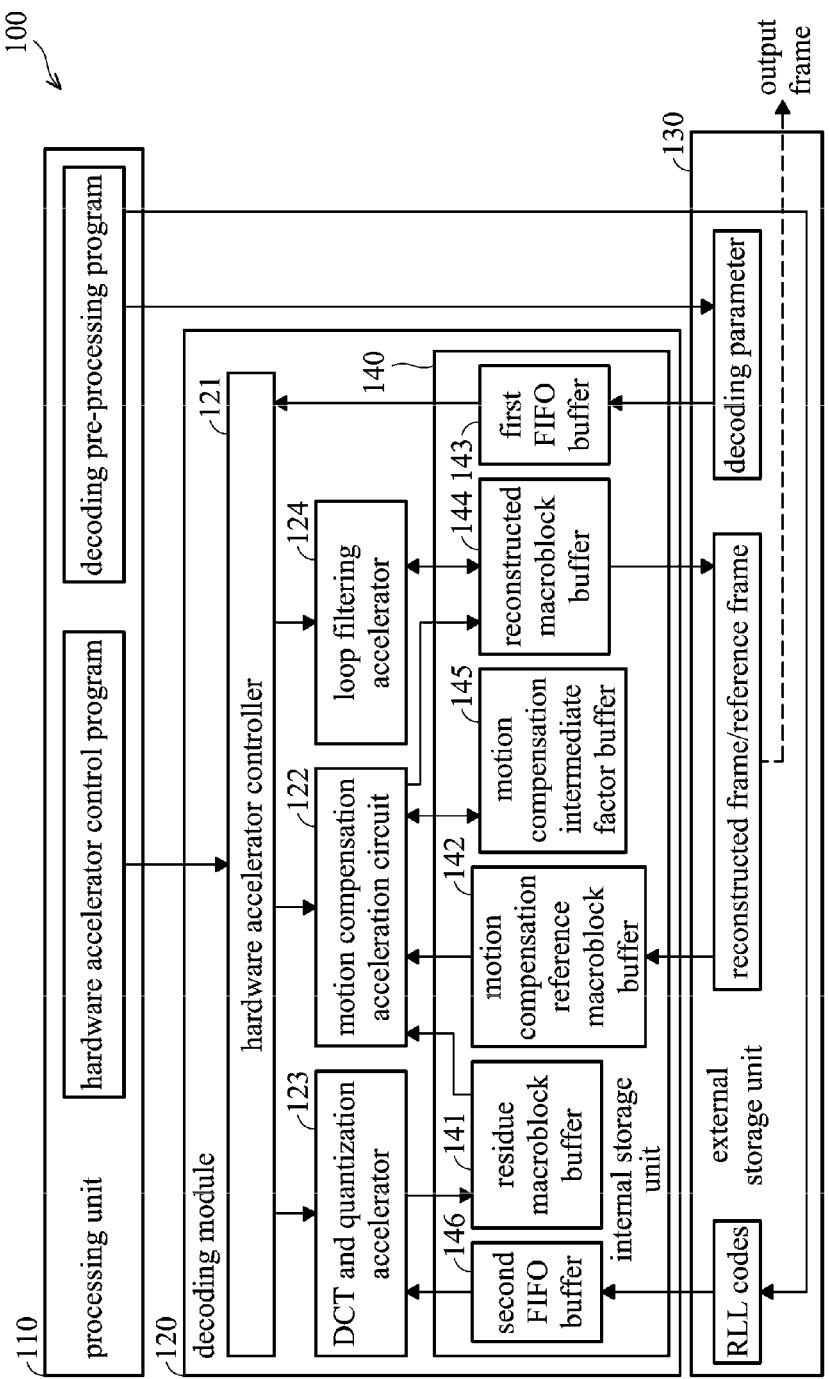
FIG. 1 is a block diagram illustrating a video decoding system according to an embodiment of the invention.

FIG. 1 is a block diagram illustrating a video decoding system according to an embodiment of the invention. The video decoding system 100 may comprise a processing unit 110, a decoding module 120, and an external storage unit 130. During the video decoding procedure in the. H.264/AVC or VC-1 standards, the processing unit 110 may be a controller configured to execute a hardware acceleration control program, and execute decoding pre-processing and post-processing, with programs such as an entropy decoding program and a decoding parameters calculating program, respectively. For example, the processing unit 110 may be a central processing unit (CPU), a digital signal processor (DSP) or other equivalent circuits implementing the same functions. The decoding module 120 may comprise a hardware accelerator controller 121, a motion compensation accelerator 122, a DCT and quantization accelerator 123, a loop filtering accelerator 124, and an internal storage unit 140. In an embodiment, the decoding module 120 may comprise a hardware decoding unit and a software decoding unit (not shown in FIG. 1). That is, each component in the decoding module 120 may be implemented by a DSP or other hardware/software configured to perform decoding processes, such as intra-frame prediction, inverse DCT, inverse quantization and zigzag scan, and loop filtering. However, the motion compensation acceleration circuit 122 is a dedicated digital circuit or hardware to implement decoding processes, such as pixel interpolation and motion compensation.

For ease of explanation, the hardware accelerator controller 121, the motion compensation acceleration circuit 122, the DCT and quantization accelerator 123, and the loop filtering accelerator 124 in the decoding module 120 of FIG. 1 is implemented by hardware. The hardware components, such as the processing unit 110 and the decoding module 120, may utilize a frame level flow or frame level pipeline control method, wherein the CPU may decode a next frame when the hardware components of the decoding module 120 decodes a current frame. The control of the data flow between each component (e.g. all hardware, or integrated by hardware/software) in the decoding module 120 may comprise macroblock level flow control. The external storage 130 is configured to store reference frames, reconstructed frames, decoding parameters, and run-length limited codes (i.e. RLL codes). For example, the external storage unit 130 may be a volatile memory component (e.g. random access memory, such as DRAM, SRAM) and/or a non-volatile memory component (e.g. ROM, hardware accelerator, CDROM).

In an embodiment, the processing unit 110 may control each component in the decoding module 120. First, the processing unit 110 may set and check register values associated with the hardware accelerator controller 121, and then activate the decoding module 120 to decode the current frame. It is necessary for the processing unit 110 to request for and register with a corresponding DMA channel, check status of the DMA channel, and set registers associated with the DMA controller (not shown in FIG. 1) to activate the DMA controller. After activating the decoding module 120 and the DMA controller by the processing unit 110, the decoding module 120 may start to decode the current frame. It should be noted that, the decoding module 120 and the processing unit 110 is controlled by a frame level flow. Before finishing the decoding procedure of each current frame by the hardware accelerator, the processing unit 110 (i.e. software) may pre-execute a decoding program (e.g. a program code) for calculating the parameters of entropy decoding/encoding of the next frame. When executing the decoding program, the processing unit 110 may detect whether the hardware decoding unit has completed the decoding procedure of the current frame. If not, the processing unit 110 may still, however, execute other programs which have a higher priority and are ready for execution. Specifically, when the decoding module 120 has finished the decoding procedure of the current frame, the decoding module 120 may generate an interrupt signal. Accordingly, an interrupt service program executed by the processing unit 110 may send an event completion signal to the decoding program. Then, the decoding program may retake control of the processing unit 110 to decode the next frame.

In another embodiment, the processing unit 110 may further perform decoding pre-processes, such as entropy decoding and calculating decoding control parameters. The processing unit 110 may perform entropy decoding to the video bitstream, and calculate decoding parameters such as motion vectors and modes of motion compensation. The processing unit 110 may further output the calculated decoding parameters and RLL codes to the external storage unit 130 (e.g. an external memory).

In an embodiment, the internal storage unit 140 may comprise a residue macroblock buffer 141, a motion compensation reference macroblock buffer 142, a first first-in-first-out (FIFO) buffer 143, a reconstructed macroblock buffer 144, a motion compensation intermediate factor buffer 145, and a second first-in-first-out buffer 146. The residue macroblock buffer 141 is configured to store residue values of macroblocks for motion compensation. The motion compensation reference macroblock buffer 142 is configured to store pixels for motion compensation. The first FIFO buffer is configured to store decoding parameters. The reconstructed macroblock buffer 144 is configured to store the reconstructed macroblocks after motion compensation (e.g. by the motion compensation acceleration circuit 122) and filtered macroblocks generated by the loop filtering accelerator 124. It should be noted that the loop filtering accelerator 124 reads the reconstructed macroblocks generated by the motion compensation acceleration circuit 122, performs loop filtering on the reconstructed macroblocks, and then writes the filtered macroblocks to the reconstructed macroblock buffer 144. The motion compensation intermediate factor buffer 145 is configured to store intermediate values of pixels for motion compensation after transposition. The second FIFO buffer 146 is configured to store the RLL codes which are used by the DCT and quantization accelerator 123.

The hardware accelerator controller 121 may read the decoding parameters from the first FIFO buffer 143, and set and manage each component in the decoding module 120. When the hardware accelerator controller 121 receives an interrupt signal indicating completion of the macroblock decoding process from the hardware (e.g. loop filtering accelerator 124) of the decoding module 120, the hardware accelerator controller 121 may read the decoding parameters from the first FIFO buffer 143, set each component of the decoding module 120, and activate corresponding hardware accelerators to decode the next macroblock according to the decoding status. When the hardware in the decoding module 120 has completed the decoding procedure of a frame, the hardware accelerator controller 121 may send an interrupt signal to the processing unit 110. In addition, the hardware accelerator controller 121 may copy the reference macroblocks for motion compensation from the external storage unit 130 to the internal storage unit 140.

The motion compensation acceleration circuit 122 is configured to perform interpolation and motion compensation on the inter-frame prediction macroblocks. Then, the motion compensation acceleration circuit 122 may reconstruct the macroblocks in the frame by the calculation of the interpolated pixels and residue values, and write the reconstructed macroblocks into the internal storage unit 140. The DCT and quantization accelerator 123 is configured to execute decoding processes, such as inverse discrete cosine transform (DCT), inverse quantization, and intra-frame prediction. The loop filtering accelerator 124 is configured to perform filtering on the reconstructed macroblocks after the motion compensation process is completed by using an in-loop de-blocking filter. Since the DCT and quantization accelerator 123 and the loop filtering accelerator 124 can be implemented by hardware or software of prior technologies, the details will not be described here.

In an embodiment, video compression standards, such as the H.264 and VC-1 standards, both use variable block size motion compensation. The two sizes of the macroblocks for motion compensation defined in the VC-1 standard are 16×16 and 8×8. In addition, there are seven sizes of macroblocks for motion compensation defined in the H.264 standard, where the smallest size is 4×4 and the largest size is 16×16. Since the hardware components in the decoding module 120 cannot access the external storage 130 directly, the hardware accelerator controller 121 has to copy the reference macroblocks for motion compensation from the external storage unit 130 to the motion compensation reference block buffer 142 of the internal storage unit 140. Then, the motion compensation accelerator 122 may read the reference pixels from the motion compensation reference block buffer 142 to perform interpolation and motion compensation. When the size of the luminance macroblock for motion compensation is 4×4, the size of corresponding chrominance macroblock is 2×2. For a motion compensation macroblock comprising a plurality of small-sized macroblocks, the data control for copying the reference pixels from the external storage unit 130 to the internal storage unit 140 is very complicated and inefficient, and thus a lot of bandwidth may be required when copying the reference blocks from the external storage unit 130 to the internal storage unit 140. In addition, the design complexity may also be significantly increased if the motion compensation acceleration circuit 122 is compatible with the seven sizes of the macroblocks for motion compensation and the interpolation values thereof.

B. H.264 Hardware/Software Division for Motion Compensation Interpolation Program In the invention, the processing unit 110 (i.e. software) is used to calculate interpolation values of motion compensation for luminance macroblocks which are smaller than an 8×8 size and chrominance macroblocks which are smaller than a 4×4 size, and thus the moving of small-sized macroblocks between the external storage unit 130 and the internal storage unit 140 is not required, thereby reducing the design complexity of the motion compensation acceleration circuit 122. Specifically, for luminance macroblocks with sizes of 16×16, 16×8, 8×16 and 8×8 and the corresponding chrominance macroblocks thereof, the hardware accelerator controller 121 may copy the reference pixels from the external storage unit 130 to the motion compensation reference macroblock buffer 142 of the internal storage unit 140 during the decoding procedure. Meanwhile, the motion compensation acceleration circuit 122 is used to perform sub-pixel interpolation and motion compensation. For luminance macroblocks with sizes of 8×4, 4×8 and 4×4 and corresponding chrominance macroblocks, the processing unit 110 may directly read the reference pixels from the external storage unit 130 to perform sub-pixel interpolation, and write the interpolation values to the external storage unit 130. Accordingly, the processing unit 110 only has to copy the interpolation values to the motion compensation reference macroblock buffer 142, and thus the hardware accelerator controller 121 may only have to perform additional operations for motion compensation. Since the same size of macroblocks for motion compensation is used in each 8×8 macroblock division, the small-sized macroblocks processed by the processing unit 110 may compose a full 8×8 luminance macroblock division and two full 4×4 chrominance macroblock divisions, thereby retrieving the interpolation values of the 8×8 luminance macroblock and the corresponding 4×4 chrominance macroblocks. Then, the hardware accelerator controller 121 may further copy the interpolation values of the 8×8 luminance macroblock and corresponding 4×4 chrominance macroblocks to the motion compensation reference macroblock buffer 142. When a specific division is being processed by the hardware accelerator controller 121, the hardware accelerator controller 121 only has to read the interpolation values of the 8×8 luminance macroblock and the corresponding 4×4 chrominance macroblocks thereof from the motion compensation reference macroblock buffer 142, and then add the residue values read from the residue macroblock buffer 141 to the interpolation values, thereby reconstructing the 8×8 luminance macroblock and the corresponding chrominance macroblocks. It should be noted that luminance macroblocks which are smaller than an 8×8 size and chrominance macroblocks which are smaller than a 4×4 size may be a very small proportion of each frame. Therefore, it may not cause serious burden to the processing unit 110 when processing the small-sized macroblocks by the processing unit 110 in the invention.

C. Storage Format

Figure 2:
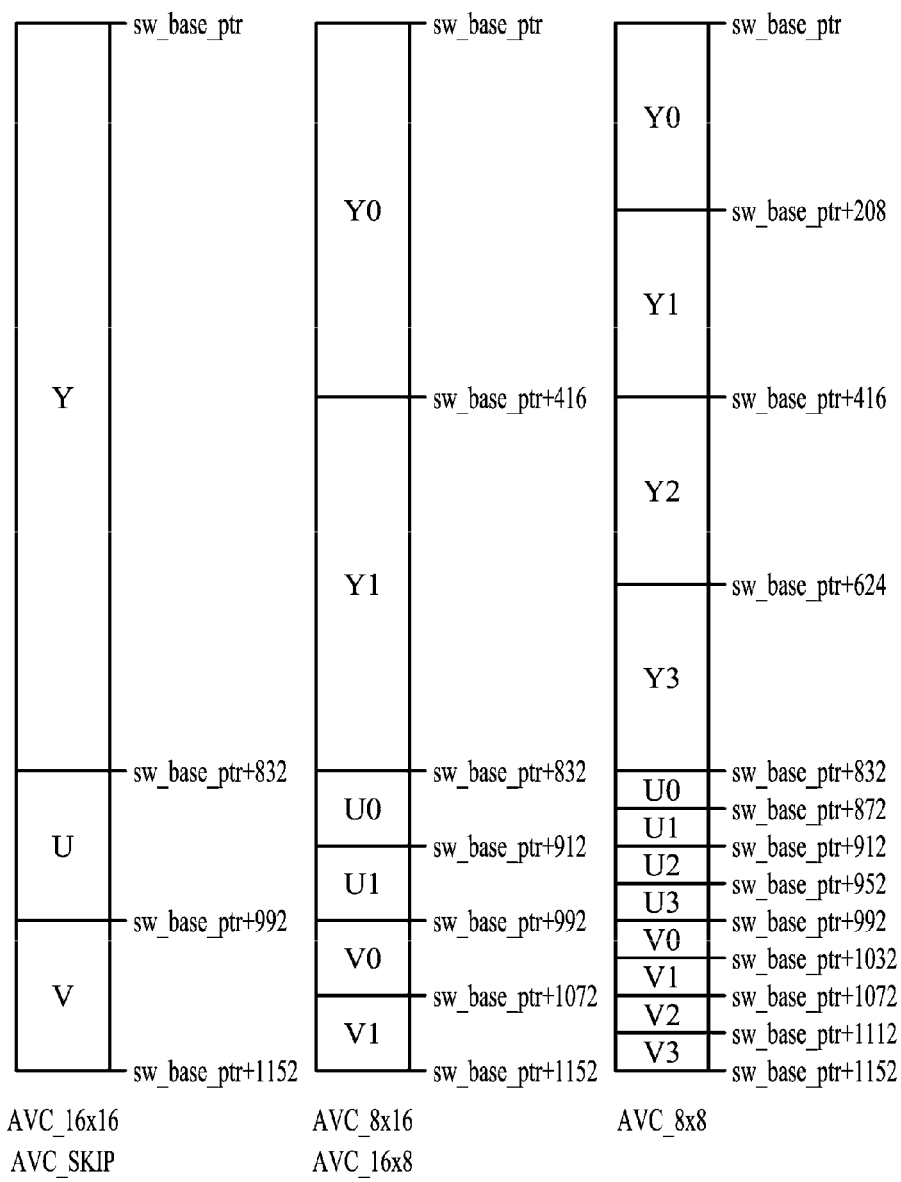
FIG. 2 is a diagram illustrating the data architecture of the motion compensation reference macroblock buffer storing the reference macroblocks for the H.264 motion compensation according to an embodiment of the invention.

The reconstructed frames and the reference frames after decoding are stored in the external storage unit. The hardware accelerator controller 121 may read reference pixels for motion compensation interpolation and interpolation values generated by the processing unit 110 from the reference frames and the reconstructed frames, respectively. The hardware accelerator controller 121 may further copy the interpolation values to the motion compensation reference macroblock buffer 142. The pixels stored in the motion compensation reference macroblock buffer 142 are in the WORD32 format. That is, each pixel is 8-bits and each four horizontally adjacent pixels are placed in the same word. Before performing motion compensation, other hardware accelerators or DSPs in the decoding module 120 may write the residue values after inverse quantization into the residue macroblock buffer 141. The motion compensation acceleration circuit 122 may read the reference pixels from the motion compensation reference macroblock buffer 142 to perform sub-pixel interpolation. Alternatively, the motion compensation acceleration circuit 122 may directly read the interpolation values as described in the aforementioned embodiment. Then, the motion compensation acceleration circuit 122 may reconstruct the macroblocks by adding the interpolation values to the respective residue values from the residue macroblock buffer 141, and then write the reconstructed macroblocks into the reconstructed macroblock buffer 144 of the internal storage unit 140.lo FIG. 2 is a diagram illustrating the data architecture of the motion compensation reference macroblock buffer storing the reference macroblocks for the H.264 motion compensation according to an embodiment of the invention. As shown in FIG. 2, Y may indicate the sub-region storing the luminance of each pixel. U and V may indicate the sub-regions storing the chrominance of each pixel, and sw_base_ptr may be a memory address pointer. In an embodiment, the motion compensation reference macroblock buffer 142 may be a ping-pong buffer, which may assure that the writing actions and reading actions of the reference pixels can be performed simultaneously. For example, the ping-pong buffer architecture of the motion compensation reference macroblock buffer 142 may indicate that the motion compensation reference macroblock buffer 142 comprises a first storage area and a second storage area. When the reference pixels are written into the first storage area by the hardware accelerator controller 121, the motion compensation acceleration circuit 122 may read the reference pixels from the second storage area. Conversely, when the reference pixels are written into the second storage area by the hardware acceleration circuit 122, the motion compensation acceleration circuit 122 may read the reference pixels from the first storage area.

Further, the hardware accelerator controller 121 may read the reference macroblocks for motion compensation from the external storage unit 130, and each reference macroblock is composed of integer pixels for motion compensation interpolation. For example, given that the size of a motion compensation macroblock is 16×8 bits, if the pixel interpolation is performed by a 6-tap linear filter horizontally and vertically, the size of the reference macroblock is 21×13. If the pixel interpolation is only performed by a 6-tap linear filter horizontally, the size of the reference macroblock is 21×8. If the pixel interpolation is only performed by a 6-tap linear filter vertically, the size of the reference macroblock is 16×13. If the pixel interpolation is not needed horizontally and vertically, the size of the reference macroblock is the same as that of the motion compensation macroblock.

Since variable size macroblock size motion compensation is used in the H.264 and VC-1 standards and the interpolation direction of each motion compensation macroblock may be different, there are many different scenarios which may be associated with the different sizes of the reference macroblocks. As for macroblocks in different modes, the amount of reference macroblocks referenced by motion compensation may be different. Accordingly, to be compatible with the many different scenarios corresponding to the different macroblock modes, each memory bank in the motion compensation reference macroblock buffer 142 may be divided into a plurality of sub-areas having different amount of memory addresses. Each sub-area may have a fixed start address and the size of each sub-area may correspond to the reference macroblocks when the motion compensation macroblocks are interpolated horizontally and vertically.

There are three motion compensation modes, such as AVC_16×16/AVC_SKIP, AVC_16×8/AVC_8×16, and AVC_8×8, for calculating interpolation values in the motion compensation acceleration circuit 122. When the motion compensation mode is AVC_8×8, the motion compensation acceleration circuit 122 may perform motion compensation (16×16 macroblock is defined in the H.264 standard) on four 8×8 luminance macroblocks and eight 4×4 chrominance macroblocks, and the motion compensation reference macroblock buffer 142 is divided into 12 sub-areas. For an 8×8 luminance motion compensation macroblock, if motion compensation interpolation is performed horizontally and vertically by a 6-tap linear filter, the size of the reference macroblock may be the largest one, such as 13×13. Further, if pixels are stored in the WORD32 format, it is necessary to extend the storage area of the horizontal pixels into any multiple of the WORD32 format, and thus the size of the storage area of each luminance macroblock is 16×13=208 bytes. For a 4×4 chrominance motion compensation macroblock, if motion compensation interpolation is performed horizontally and vertically by using a linear filter, the size of the reference macroblock is 5×5. Similarly, it is necessary to extend the storage area of horizontal pixels into any multiple of the WORD32 format, and thus the size of the storage area of each chrominance macroblock is 8×5=40 bytes.

When the motion compensation mode is AVC_16×8/AVC_8×16, the motion compensation acceleration circuit 122 may perform motion compensation to two 16×8/8×16 luminance macroblocks and four 8×4/4×8 chrominance macroblocks, and the motion compensation reference macroblock buffer 142 is divided into six sub-areas. Accordingly, two adjacent sub-areas under the AVC_8×8 can be combined into a sub-area for storing six reference macroblocks in the AVC_16×8/AVC_8×16 mode. When the motion compensation mode is AVC_16×16/AVC_SKIP, the motion compensation acceleration circuit 122 may perform motion compensation to one 16×16 luminance macroblock and two 8×8 chrominance macroblocks, and the motion compensation reference macroblock buffer 142 is only divided into three sub-areas. That is, four adjacent sub-areas in the AVC_8×8 mode can be combined into another sub-area for storing three reference macroblocks in the AVC_16×16/AVC_SKIP mode.

For motion compensation modes, such as AVC_8×4, AVC_4×8 and AVC_4×4, having small-sized reference macroblocks, motion compensation is performed by the processing unit 110 (e.g. a CPU) in the invention. The processing unit 110 may read the reference pixels from the external storage unit 130 and then calculate interpolations for motion compensation. The motion compensation interpolation values can be combined into one 8×8 luminance macroblock and two 4×4 chrominance macroblocks, and the processing unit 110 may store the combined 8×8 luminance macroblock and chrominance macroblocks into corresponding sub-areas in the motion compensation reference macroblock buffer 142 in the AVC_8×8 mode.

Figure 3:
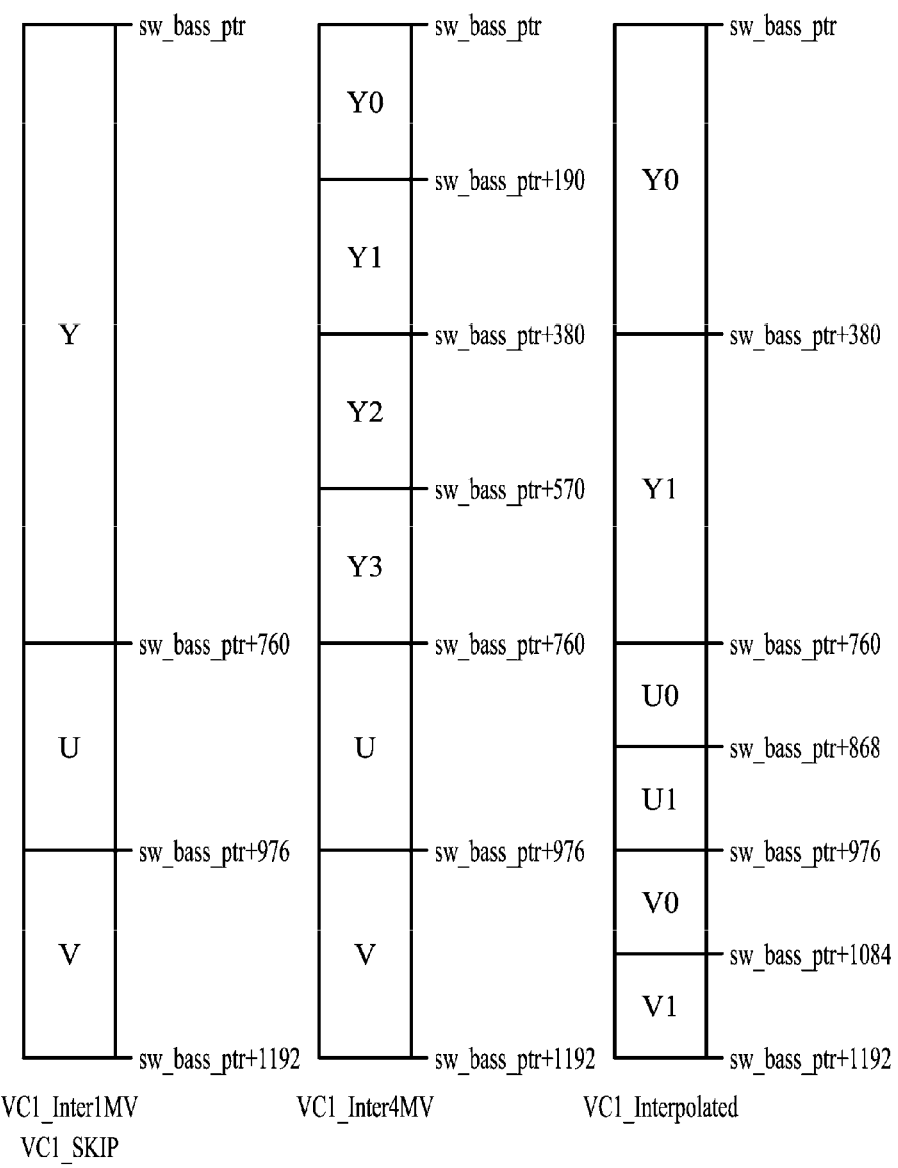
FIG. 3 is a diagram illustrating the structure of the motion compensation reference macroblock buffer storing VC-1 motion compensation reference macroblocks according to an embodiment of the invention.
Figure 4A:
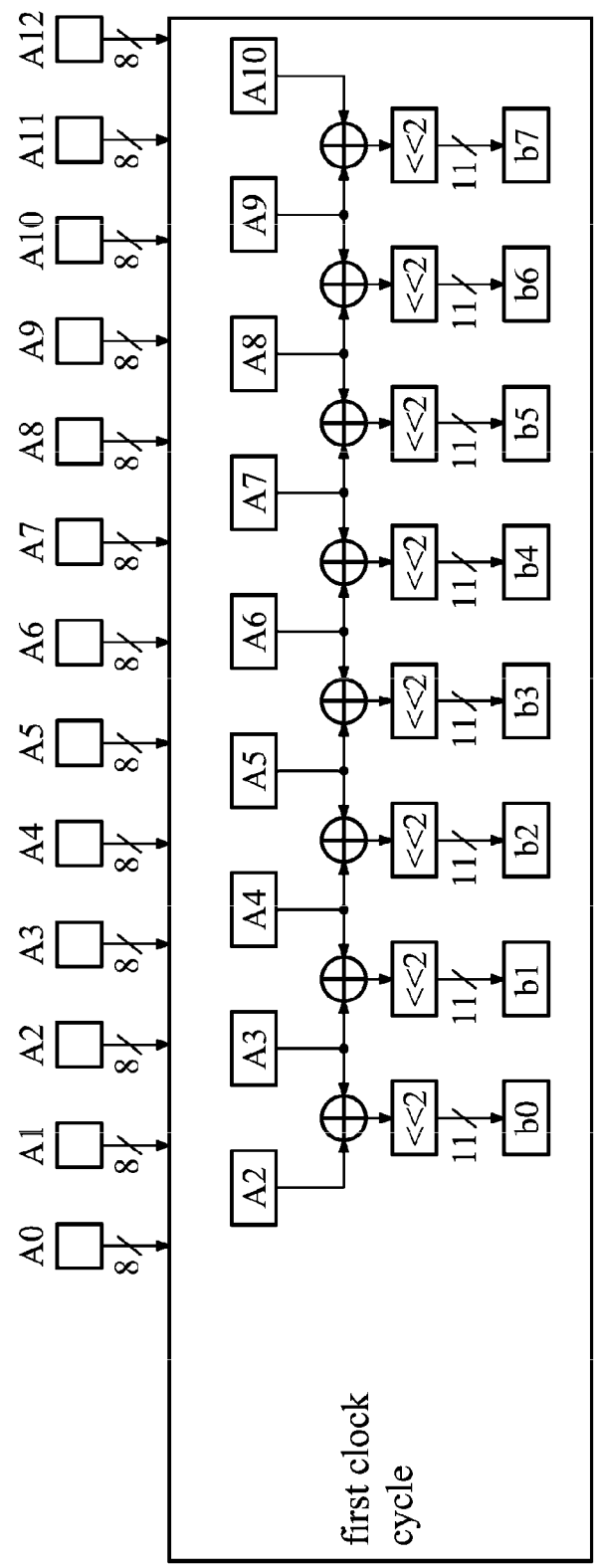
FIGS. 4A to 4D are parts of a flow chart illustrating motion compensation interpolation in the H.264 standard by using the motion compensation acceleration circuit according to an embodiment of the invention.
Figure 4B:
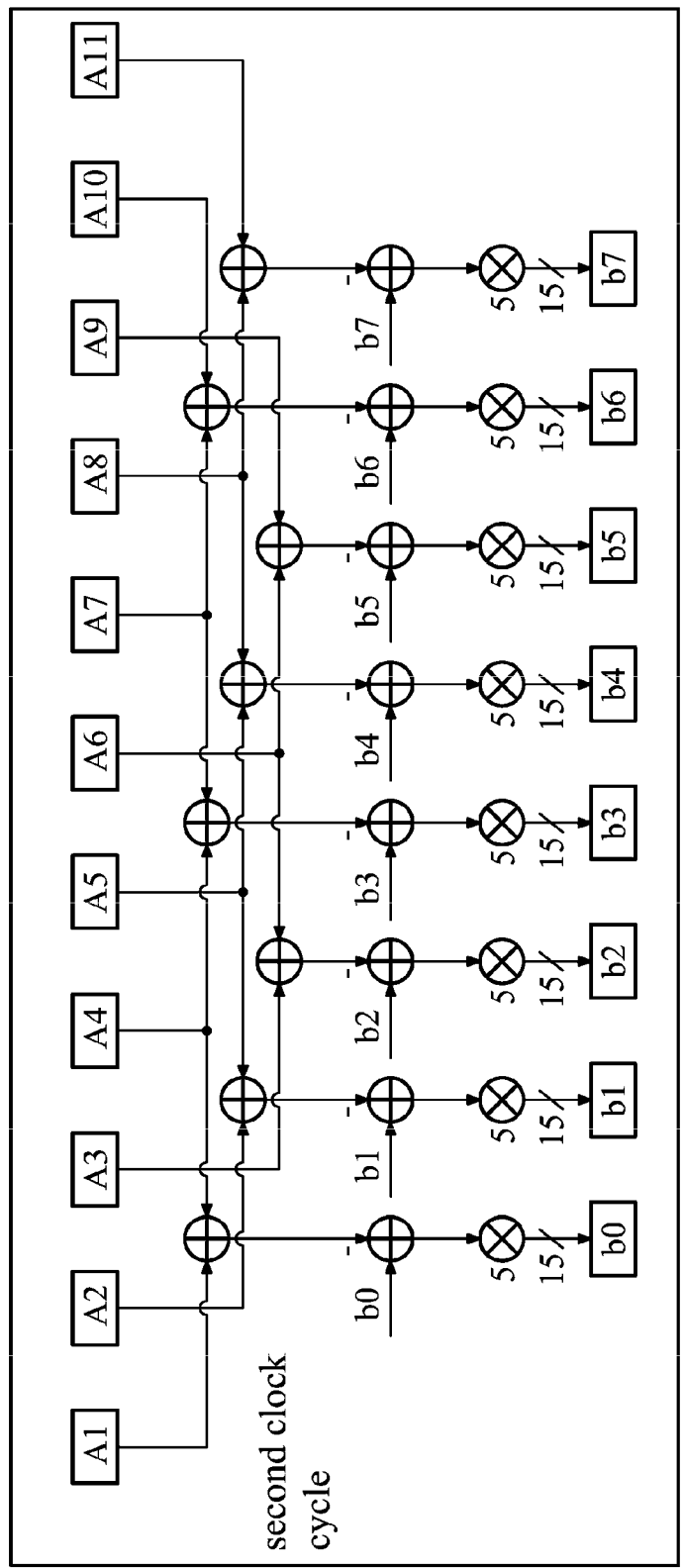
Figure 4C:
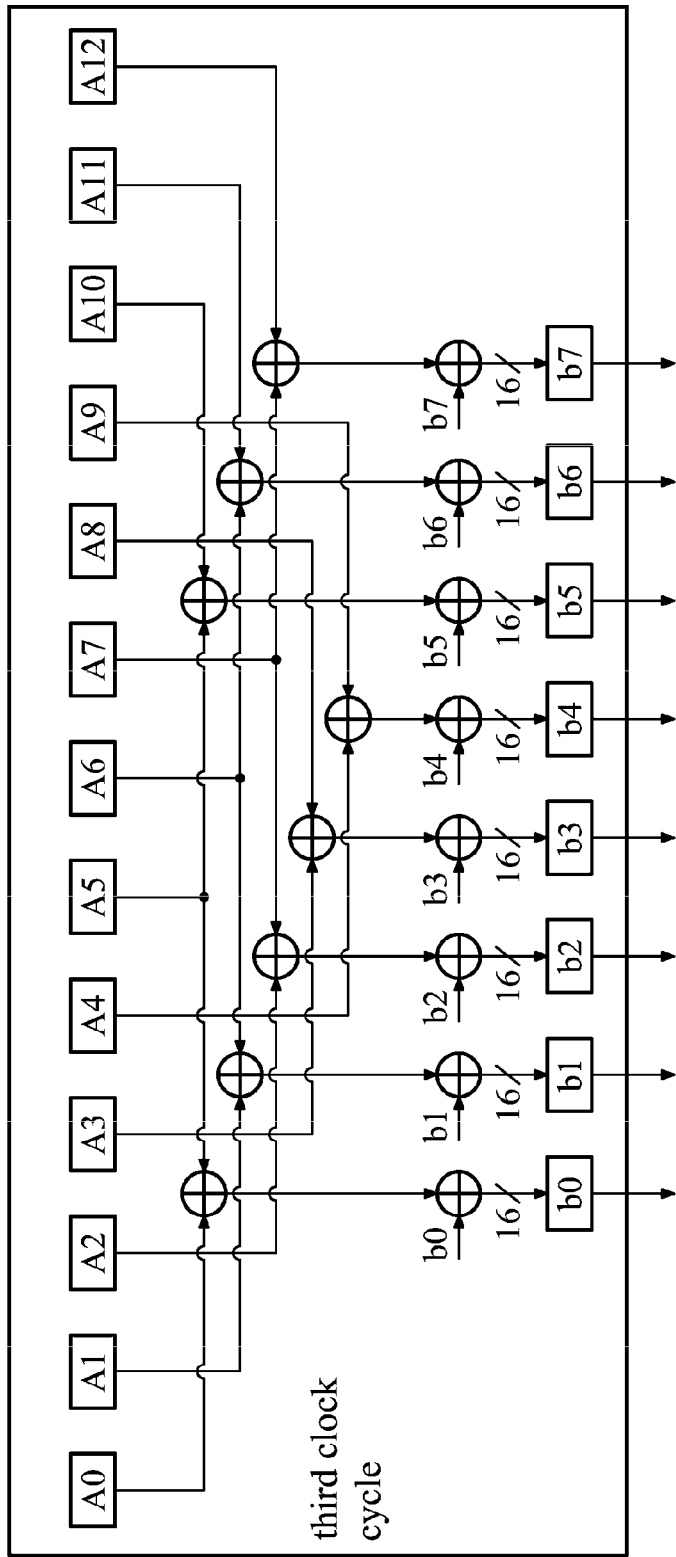
Figure 4D:
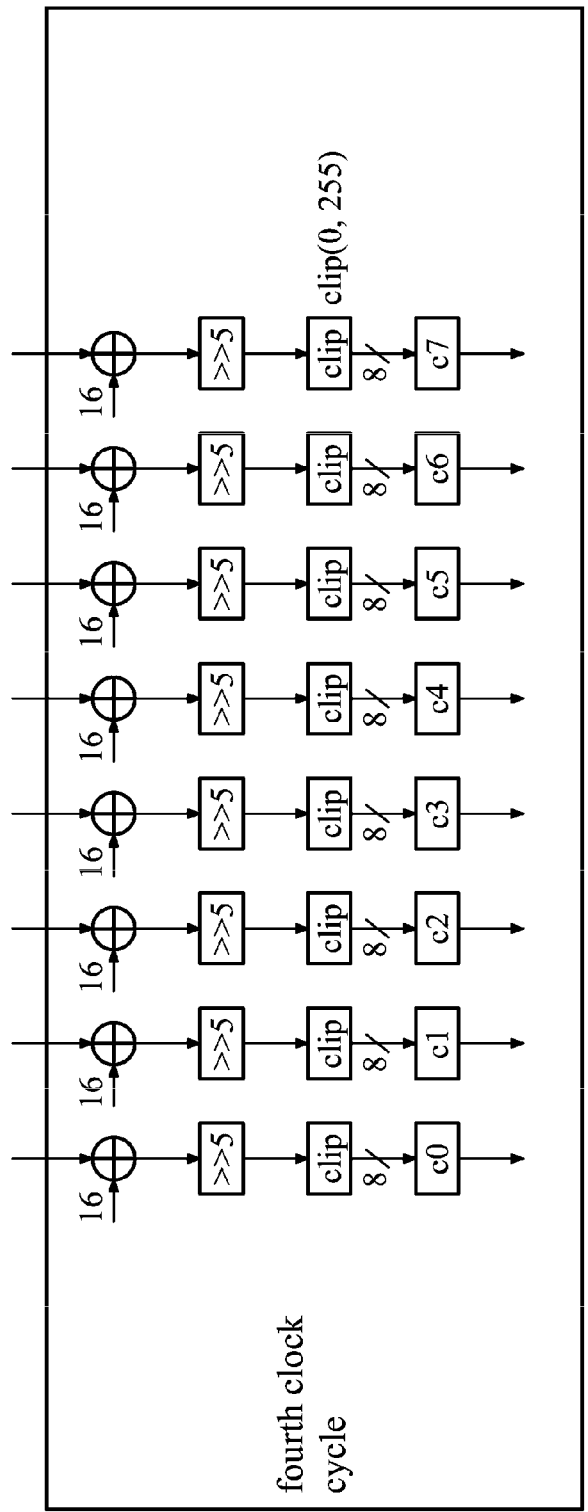
Figure 5A:
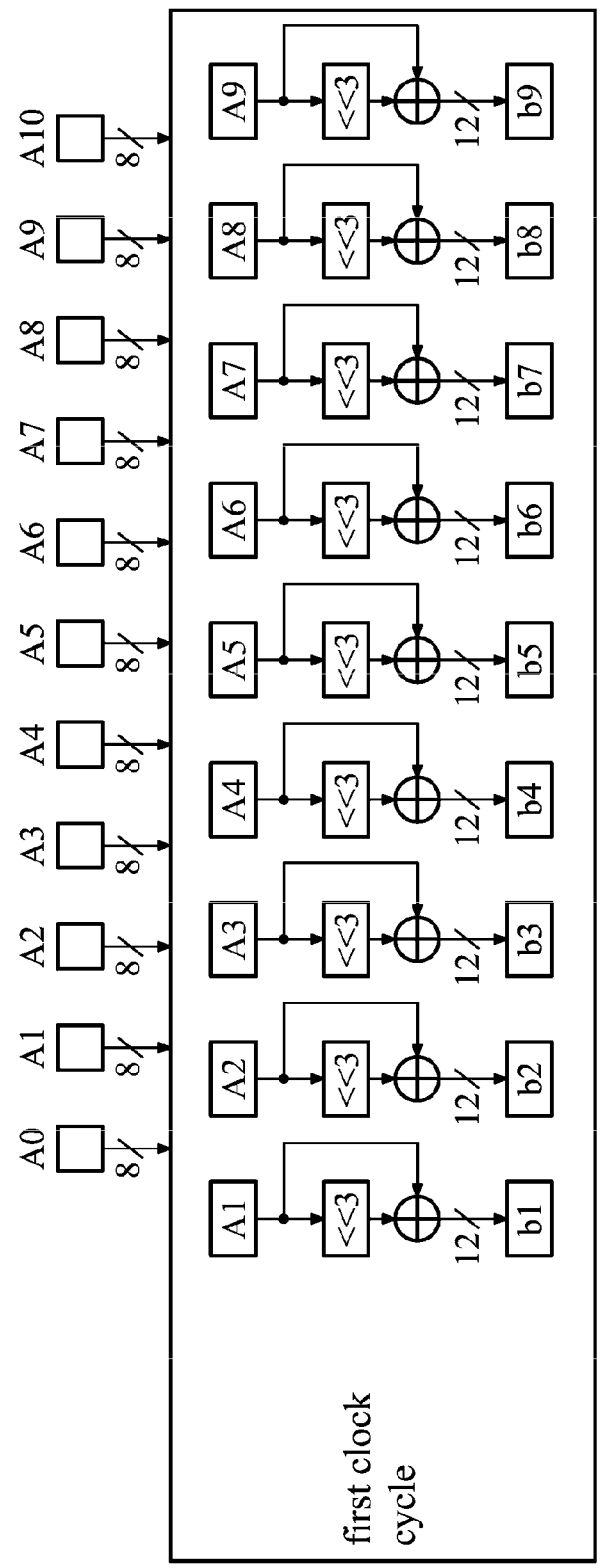
FIGS. 5A~5D are parts of a flow chart illustrating motion compensation interpolation in the VC-1 standard by using the motion compensation acceleration circuit according to an embodiment of the invention.
Figure 5B:
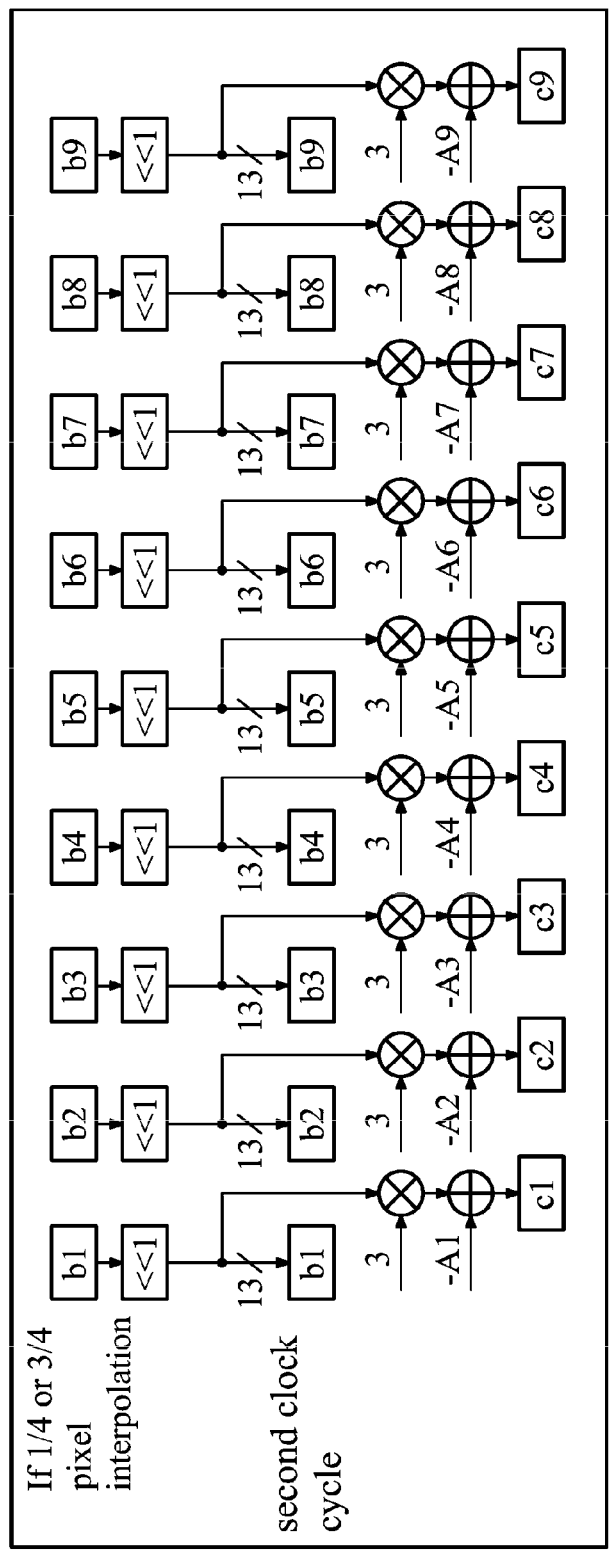
Figure 5C:
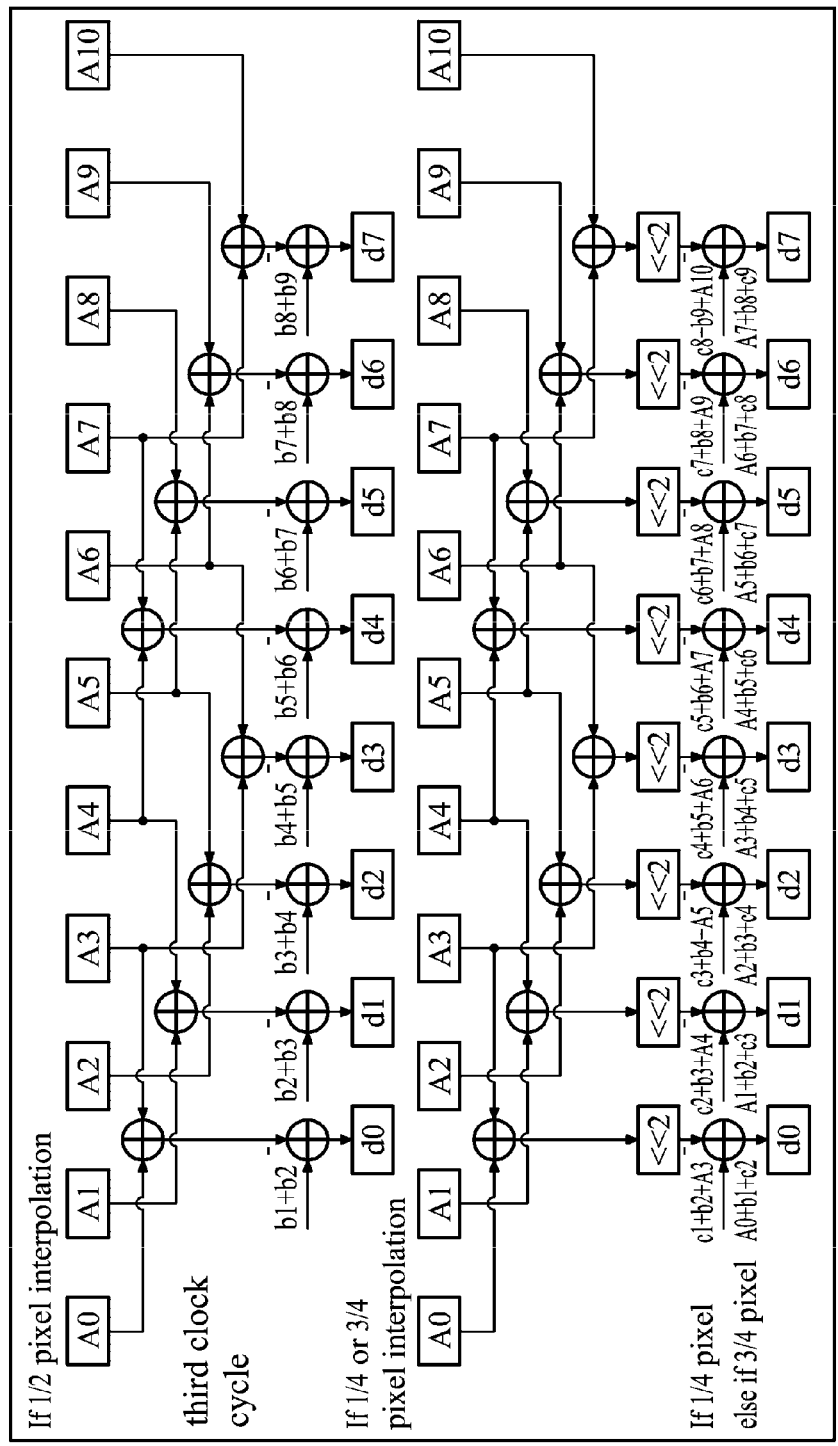
Figure 5D:
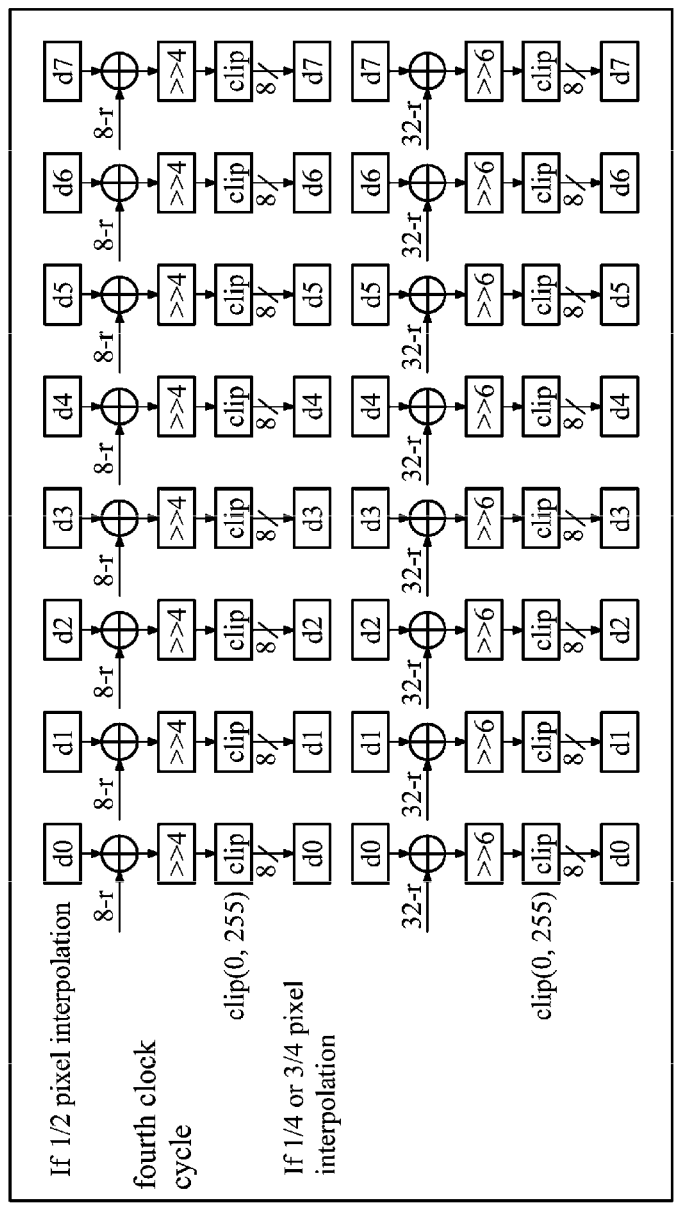

FIG. 3 is a diagram illustrating the structure of the motion compensation reference macroblock buffer storing VC-1 motion compensation reference macroblocks according to an embodiment of the invention, wherein Y indicates the sub-areas storing luminance values of pixels, U and V indicate sub-areas storing chrominance values of pixels, and sw_bass_ptr is a memory address pointer. In the VC-1 standard, there are three motion compensation modes: VC1_Inter1MV/VC1_SKIP, VC1_Inter4MV, and VC1_Interpolated. The VC_Inter1MV/VC_SKIP mode is similar to the AVC_16×16/AVC_SKIP mode in the H.264 standard, and interpolation for motion compensation is performed to one 16×16 luminance macroblock and two 8×8 chrominance macroblocks, and the motion compensation reference macroblock buffer 142 is divided into three sub-areas. The VC1_Inter4MV mode is similar to the AVC_8×8 mode in the H.264 standard, and interpolation for motion compensation is performed to four 8×8 luminance macroblocks with only two 8×8 chrominance macroblocks. In the VC1_Inter4MV mode, the motion compensation reference macroblock buffer 142 is divided into six sub-areas. The VC1_Interpolated mode indicates bi-directional motion interpolation, and there are one 16×16 luminance macroblock and two 8×8 chrominance macroblocks for forward prediction and backward prediction, respectively. In the VC1_Interpolated mode, the motion compensation reference macroblock buffer 142 is divided into six sub-areas.

D. Structure of the Motion Compensation Acceleration Circuit

D-1 H.264 Luminance Macroblock Interpolation and VC-1 Bi-Cubic Interpolation

In the H.264 standard, luminance half pixels for motion compensation are interpolated by a 6-tap linear filter, and luminance quarter pixels are interpolated by using the interpolation values of the luminance half pixels with a bilinear filter. Motion compensation interpolation for chrominance values of pixels in the H.264 standard is performed by using a 4-tap linear filter. Motion compensation in the VC-1 standard can comprise bilinear interpolation and bi-cubic interpolation, and the same method is used for the interpolation of the luminance values and chrominance values of pixels. The bi-cubic interpolation may use three sets of 4-tap linear filters, wherein one of the sets is configured to generate half pixels, and the others are configured to generate quarter pixels.

FIGS. 4A to 4D are parts of a flow chart illustrating motion compensation interpolation in the H.264 standard by using the motion compensation acceleration circuit according to an embodiment of the invention. The 6-tap linear filter of H.264 standard is implemented by four phases in the motion compensation acceleration circuit 122, thereby reducing delay time in critical paths. The Interpolation Formula (1) in the motion compensation acceleration circuit 122 can be expressed as following:

$$c = \text{Clip}(0, 255, ((A_1 - 5A_2 + 20A_3 + 20A_4 - 5A_5 + A_6) + 16) >> 5) \tag{1}$$

wherein A1~A6 indicates six adjacent integer reference pixels, and c indicates the half pixel interpolated by using the integer reference pixels A1~A6. It should be noted that, the coefficients of pixels A1~A6 is not limited, and the coefficients can be replaced by other coefficients of an appropriate linear filter. For example, the Interpolation Formula (1) can be re-written as following:

$$c = \text{Clip}(0, 255, (5*(((A_3 + A_4) << 2) - (A_2 + A_5)) + (A_1 + A_6) + 16) >> 5) \tag{2}$$

Referring to FIGS. 4A~4D, eight parallel 6-tap linear filters are used in the motion compensation acceleration circuit 122 to complete the half-pixel interpolation in the H.264 standard, wherein the thirteen adjacent pixels A0~A12 are pre-written into the registers. The interpolation for motion compensation in the motion compensation acceleration circuit 122 can be implemented by four clock cycles. During the first clock cycle, the motion compensation acceleration circuit 122 may calculate the intermediate value $b_i = (A_{i+3} + A_{i+4}) << 2$ ($0 \leq i \leq 7$). During the second clock cycle, the intermediate value $b_i = (b_i - (A_{i+2} + A_{i+5})) * 5$ is calculated. During the third clock cycle, the intermediate value $b_i = b_i + (A_{i-1} + A_{i+6})$ is calculated. During the fourth clock cycle, the intermediate value $b_i = \text{Clip}(0, 255, (b_i + 16) >> 5)$ is calculated, thereby obtaining the half pixel $c_i$ ($0 \leq i \leq 7$). Accordingly, interpolation of eight half pixels in a row (or a column) for the H.264 standard can be completed in four clock cycles by the motion compensation acceleration circuit 122.

FIGS. 5A~5D are parts of a flow chart illustrating motion compensation interpolation in the VC-1 standard by using the motion compensation acceleration circuit according to an embodiment of the invention. Similar to the H.264 standard, the bi-cubic 4-tap linear filters in the VC-1 standard can be divided into four phases, thereby reducing delay time in critical paths. Three bi-cubic 4-tap linear filters defined in the VC-1 standard can be expressed in the Interpolation Formulas (3), (4) and (5) which correspond to half-pixel interpolation, quarter-pixel interpolation, and third quarter pixel interpolation, respectively.

$$d = \text{Clip}(0, 255, (-A_1 + 9*A_2 + 9*A_3 - A_4 + 8 - r) >> 4) \tag{3}$$

$$d = \text{Clip}(0, 255, (-4*A_1 + 53*A_2 + 18*A_3 - 3*A_4 + 32 - r) >> 6) \tag{4}$$

$$d = \text{Clip}(0, 255, (-3*A_1 + 18*A_2 + 53*A_3 - 4*A_4 + 32 - r) >> 6) \tag{5}$$

wherein A1~A4 in the Interpolation Formulas (3), (4) and (5) indicate four adjacent integer reference pixels, d indicate the sub-pixel interpolated by using the integer reference pixels A1~A4, and r indicate a rounding parameter. In addition, the Interpolation Formulas (3), (4) and (5) can be re-written into the Interpolation Formulas (6), (7) and (8), respectively.

$$d = \text{Clip}(0, 255, (-1*(A1 + A4) + 9*A2 + 9*A3 + (8 - r)) >> 4) \tag{6}$$

$$d = \text{Clip}(0, 255, (-4*(A1 + A4) + 3*2*9*A2 + 2*9*A3 - A2 + A4 + (32 - r)) >> 6) \tag{7}$$

$$d = \text{Clip}(0, 255, (-4*(A1 + A4) + 2*9*A2 + 3*2*9*A3 - A3 + A1 + (32 - r)) >> 6) \tag{8}$$

As illustrated in FIGS. 5A~5D, eight parallel 4-tap filters are used in the motion compensation acceleration circuit 122 to complete half-pixel interpolation of a motion compensation 8×8 macroblock in the VC-1 standard. The bi-cubic interpolation in the VC-1 standard can be implemented by four clock cycles in the motion compensation acceleration circuit 122. During the first clock cycle, the motion compensation acceleration circuit 122 may calculate the intermediate value $b_i = 9 * A_i$ ($1 \leq i \leq 9$). During the second clock cycle, two different scenarios are introduced. In the first scenario, if the motion compensation acceleration circuit 122 is used to perform half-pixel interpolation, a one-clock-cycle delay is performed (i.e. jumped or delayed to the third clock cycle). In the second scenario, if the motion compensation acceleration circuit 122 is used to calculate quarter pixels or third quarter pixels, the motion compensation acceleration circuit 122 may calculate the intermediate value $b_i = 2 * b_i$ and the half pixel $c_i = 6 * b_i - A_i$ ($1 \leq i \leq 9$). During the third clock cycle, three scenarios are considered. In the first scenario, if the motion compensation acceleration circuit 122 is used to perform half-pixel interpolation, the half pixel $c_i = -1 * (A_i + A_{i+3}) + (b_{i+1} + b_{i+2})$ ($0 \leq i \leq 8$) is calculated. In the second scenario, if the motion compensation acceleration circuit 122 is used to perform quarter pixel interpolation, the motion compensation acceleration circuit 122 may calculate the half pixel $c_i = -((A_i + A_{i+3}) << 2) + b_{i+2} + c_{i+1} + A_{i+3}$. In the third scenario, if the motion compensation acceleration circuit 122 is used to perform third quarter pixel interpolation, the motion compensation acceleration circuit 122 may calculate the half pixel $c_i = -((A_i + A_{i+3}) << 2) + b_{i+1} + c_{i+2} + A_i$. During the fourth clock cycle, two scenarios are considered. In the first scenario, if the motion compensation acceleration circuit 122 is used to perform half pixel interpolation, the motion compensation acceleration circuit 122 may calculate the sub pixel $d_i = \text{Clip}(0, 255, (d_i + 8 - r) >> 4)$. In the second scenario, if the motion compensation acceleration circuit 122 is used to perform quarter pixel interpolation or third quarter pixel interpolation, the motion compensation acceleration circuit 122 may calculate the sub-pixel $d_f$=Clip(0, 255, $(d_f+32-r)>>6$). Accordingly, interpolation of eight half pixels in a row (or a column) in the VC-1 standard can be completed in four clock cycles by the motion compensation acceleration circuit 122.

The reference pixels are stored in the motion compensation reference macroblock buffer 142 with the WORD32 format, and the motion compensation acceleration circuit 122 may read a pixel word from the motion compensation reference macroblock buffer 142 every clock cycle. Further, the motion compensation acceleration circuit 122 may divide the pixel word into four pixels and write the four pixels into internal registers. Briefly, the motion compensation acceleration circuit 122 may read all of the 13 integer pixels in a row from the motion compensation reference macroblock buffer 142, and write the integer pixels into the internal registers in four clock cycles.

Figure 6:
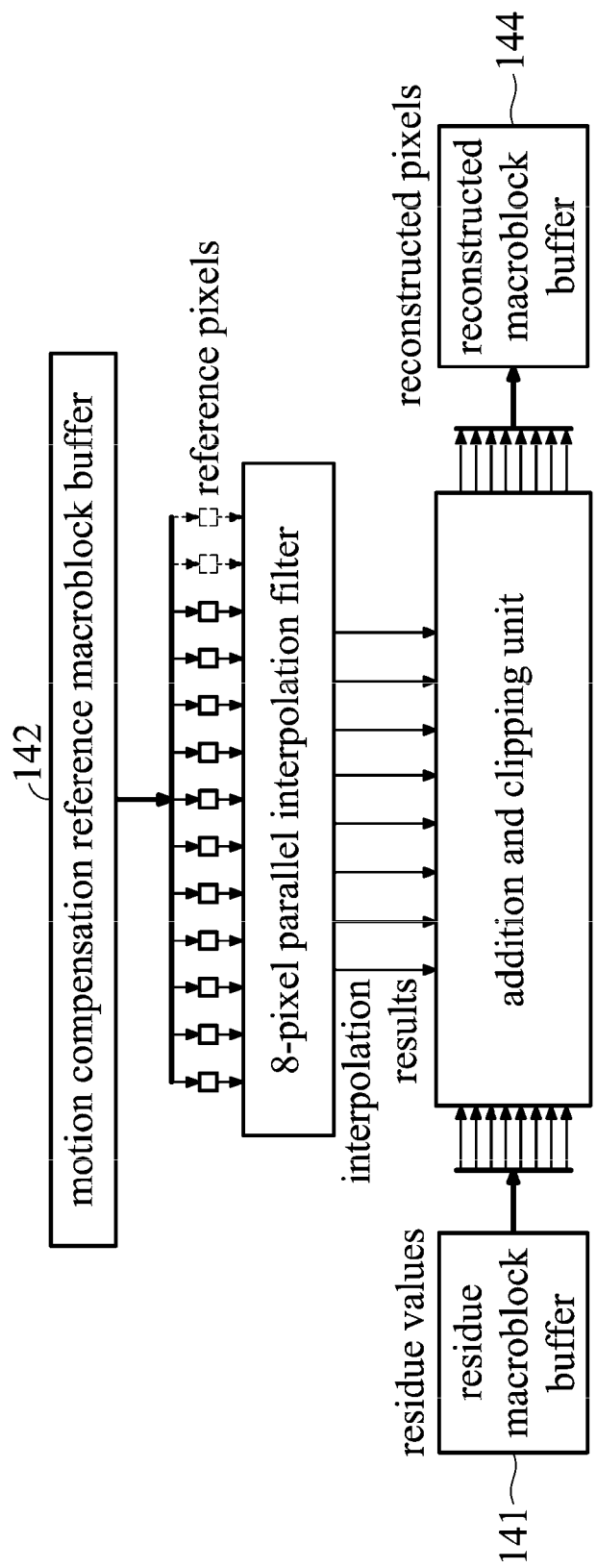
FIG. 6 is a diagram illustrating horizontal interpolation for motion compensation according to an embodiment of the invention.

FIG. 6 is a diagram illustrating horizontal interpolation for motion compensation according to an embodiment of the invention. As illustrated in FIG. 6, if the motion compensation acceleration circuit 122 is used to perform horizontal half-pixel interpolation for the H.264 standard, wherein eight half pixels in a row can be interpolated every four clock cycles. Then, the motion compensation acceleration circuit 122 may read eight residue values in a row from the residue macroblock buffer 141. Accordingly, eight pixels in a row can be reconstructed by performing addition and clipping of the eight half pixels via an addition and clipping unit of the motion compensation acceleration unit 122. After repeating the aforementioned steps 8 times, motion compensation of an 8×8 macroblock can be completed. Half-pixel interpolation of a 16×16 macroblock can be completed by performing half-pixel interpolation of an 8×8 macroblock 4 times. Half-pixel interpolation of a 16×8 macroblock or an 8×16 macroblock can be completed by performing half-pixel interpolation of an 8×8 macroblock twice.

Generally, pixels in a macroblock are processed in a raster scan order. However, pixels should be processed row by row when performing vertical interpolation and diagonal interpolation. Since the pixels stored in the motion compensation reference macroblock buffer 142 and the residue macroblock buffer 141 are in the WORD32 format, it is more efficient to read/write these pixels row by row. In view of this, the motion compensation acceleration circuit 122 may use a transposition register array to implement transposition of a 13×8 or 13×13 pixel matrix, thereby ensuring that the same hardware circuit can be used to filter the pixels while performing vertical interpolation and diagonal interpolation.

Figure 7:
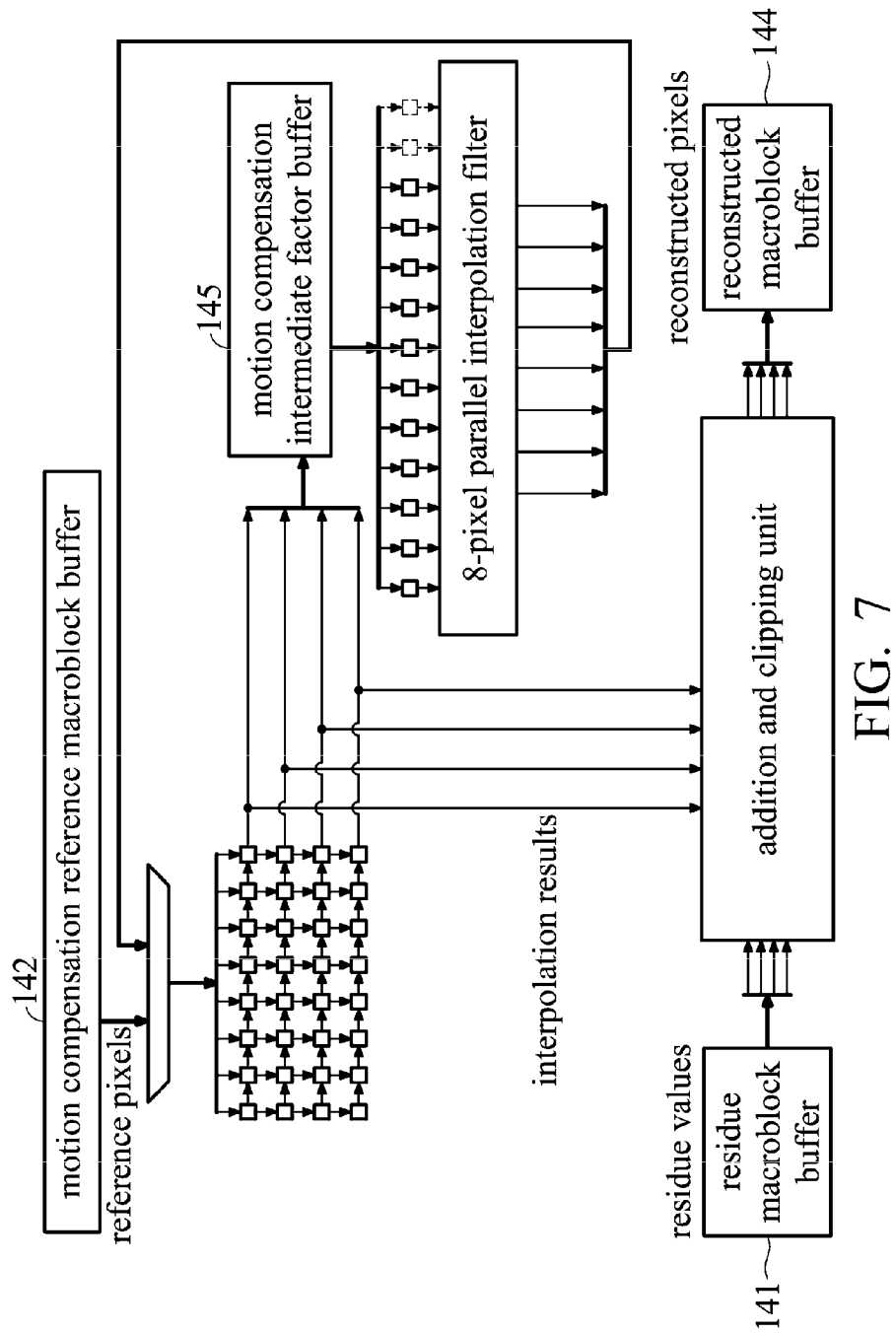
FIG. 7 is a diagram illustrating vertical interpolation for motion compensation according to an embodiment of the invention.

FIG. 7 is a diagram illustrating vertical interpolation for motion compensation according to an embodiment of the invention. In an embodiment, for half-pixel vertical interpolation in the H.264 standard, the motion compensation acceleration circuit 122 should read an 8×13 pixel matrix from the motion compensation reference macroblock buffer 142, and transpose the 8×13 pixel matrix to a 13×8 matrix, as illustrated in FIG. 7. The transposed pixel matrix is stored in a motion compensation intermediate factor buffer 145. The motion compensation acceleration circuit 122 may read the 13 integer reference pixels in a row from the motion compensation intermediate factor buffer 145 to the internal registers, and perform interpolation by using an eight-pixel parallel linear filter, thereby generating an 8×8 half-pixel matrix. Next, the motion compensation acceleration circuit 122 may transpose the generated 8×8 half-pixel matrix again. Then, the addition and clipping unit of the motion compensation acceleration circuit 122 may add the transposed 8×8 half-pixel matrix to the residue values read from the residue macroblock buffer 141, and clip the summation to [0, 255], thereby generating an 8×8 reconstructed macroblock. The transposition register set is an 8×4 array, and each register is 8-bits. Further, the transposition register array is read or written row by row. Accordingly, the transposition register array should be read/written 4 times to transpose an 8×13 pixel matrix to a 13×8 pixel matrix. The transposition register array should be read/written twice to transpose an 8×8 array to another 8×8 array. For sub-pixel vertical interpolation in the VC-1 standard, the motion compensation acceleration circuit 122 should read an 8×11 pixel matrix from the motion compensation reference macroblock buffer 142, and transpose the 8×11 pixel matrix to an 11×8 matrix. Thus, the transposition register array should be only read/written repeatedly for 3 times to transpose the 8×11 pixel matrix. Other interpolations in the VC-1 standard are similar to the vertical interpolation in the H.264 standard.

Figure 8:
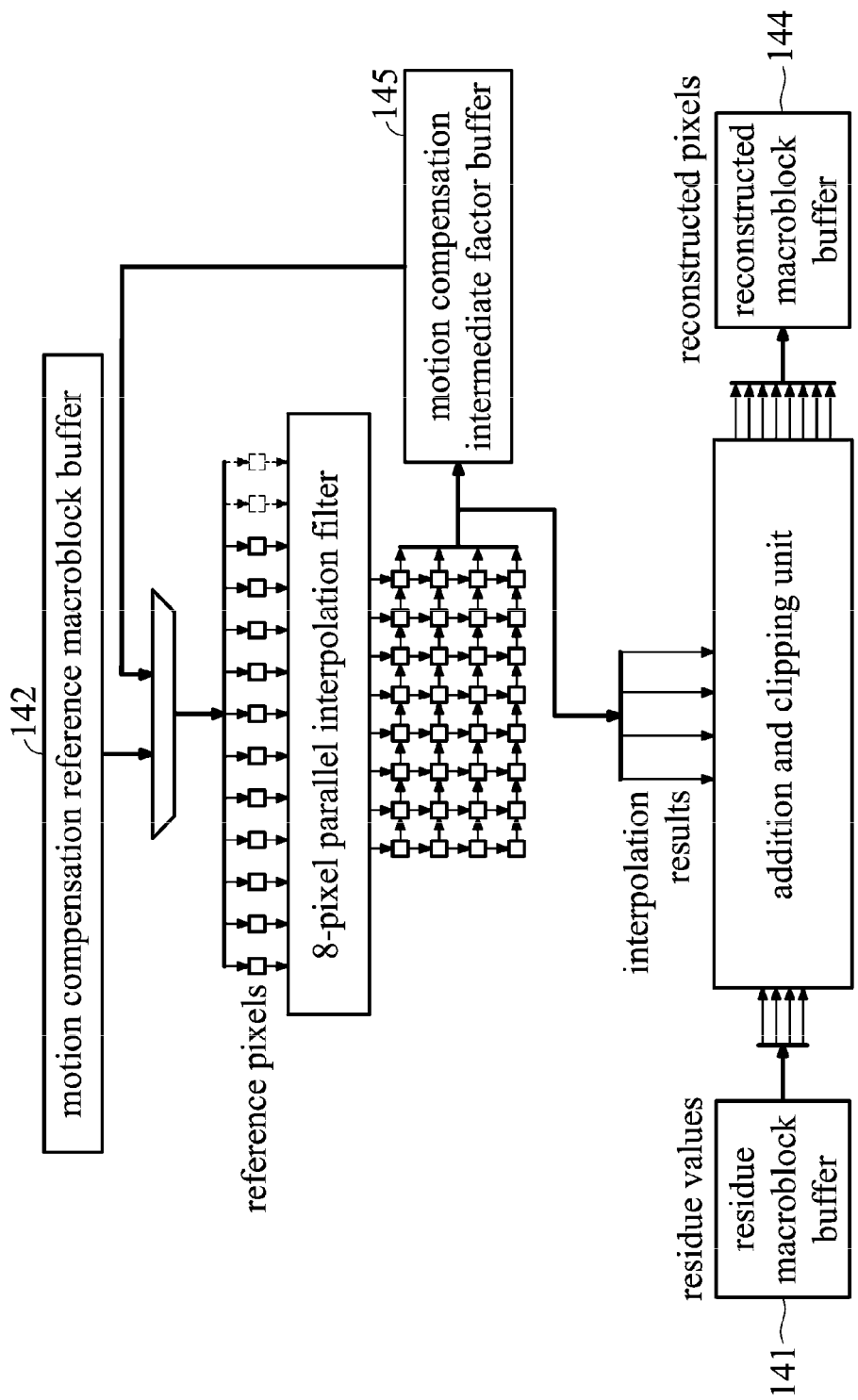
FIG. 8 is a diagram illustrating diagonal interpolation for motion compensation according to an embodiment of the invention.

FIG. 8 is a diagram illustrating diagonal interpolation for motion compensation according to an embodiment of the invention. There are two scenarios for half-pixel diagonal interpolation in the H.264 standard. The first scenario may comprise performing horizontal interpolation before vertical interpolation. The other scenario may comprise performing vertical interpolation before horizontal interpolation. As illustrated in FIG. 8, if horizontal interpolation is performed first, the motion compensation acceleration circuit 122 may read a 13×13 integer pixel matrix from the motion compensation reference macroblock buffer 142 to perform horizontal interpolation, thereby obtaining an 8×13 intermediate pixel matrix. Then, the motion compensation acceleration circuit 122 may transpose the 8×13 intermediate pixel matrix to a 13×8 pixel matrix, and write the 13×8 pixel matrix into the motion compensation intermediate factor register 145. The motion compensation acceleration circuit 122 may read all of the integer reference pixels from the motion compensation intermediate factor buffer 145 8 times, where all of the 13 integer reference pixels in a row is read to the internal registers each time. The integer reference pixels are interpolated by an 8-pixel parallel linear filter, thereby generating an 8×8 half-pixel matrix. Next, the motion compensation acceleration circuit 122 may transpose the 8×8 half-pixel matrix again. Then the addition and clipping unit of the motion compensation acceleration circuit 122 may add the transposed 8×8 half-pixel matrix to the residue values read from the residue macroblock buffer 141, and clip the summation to [0, 255], thereby generating an 8×8 reconstructed macroblock. It should be noted that the same 8×4 transposition register is used in the aforementioned two transposition steps.

Figure 9:
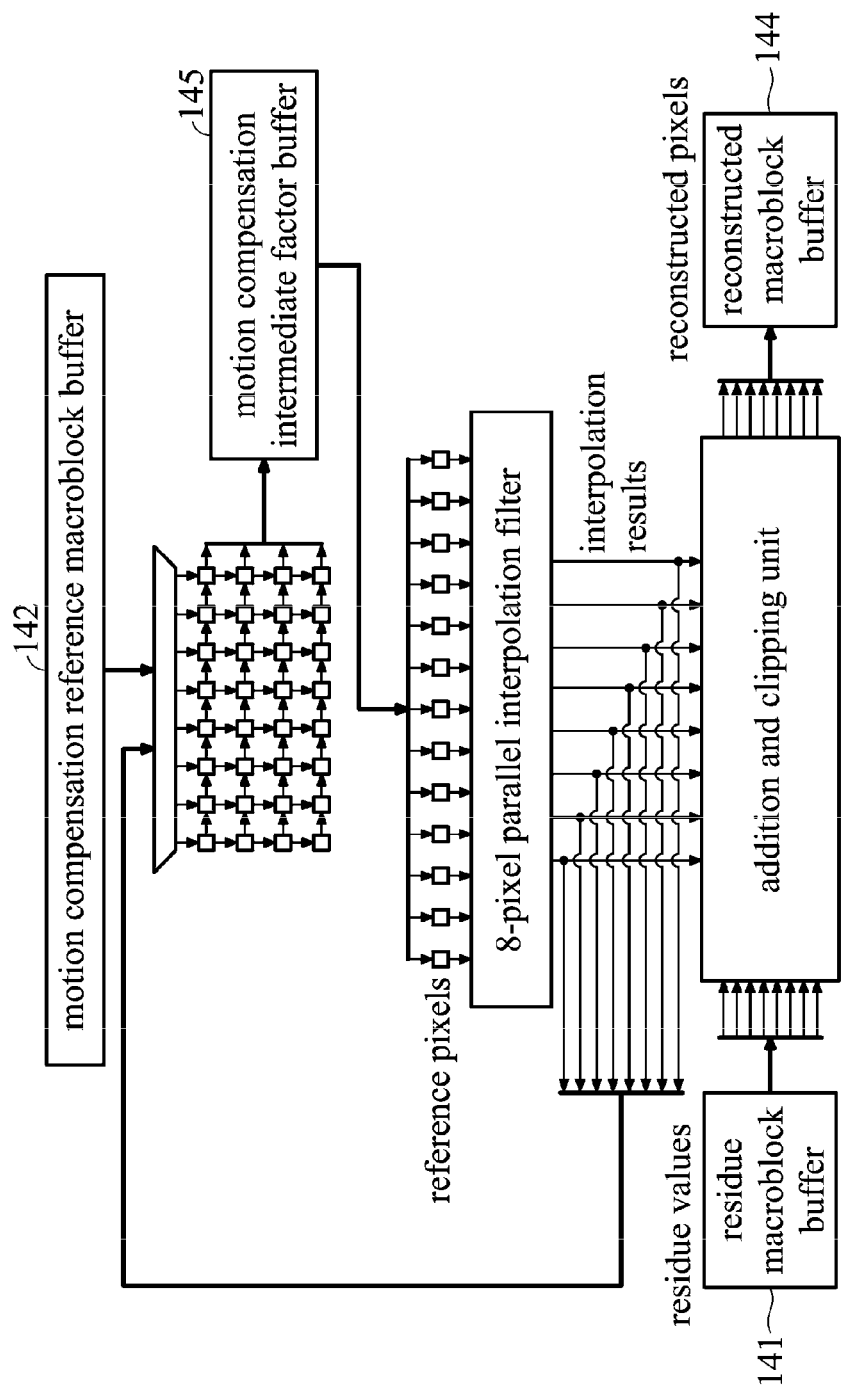
FIG. 9 is a diagram illustrating diagonal interpolation for motion compensation according to another embodiment of the invention.

FIG. 9 is a diagram illustrating diagonal interpolation for motion compensation according to another embodiment of the invention. As illustrated in FIG. 9, if vertical interpolation for motion compensation is performed first, the motion compensation acceleration circuit 122 may have to transpose the 13×13 integer pixel matrix read from the motion compensation reference macroblock buffer 142. The transposed 13×13 pixel matrix is stored in the motion compensation intermediate factor buffer 145. The motion compensation acceleration circuit 122 may read all of the reference pixels from the motion compensation intermediate factor buffer 145 13 times. All of the 13 integer reference pixels in a row are read to the internal registers each time, and the integer reference pixels are interpolated by an 8-pixel parallel linear filter. Next, the motion compensation acceleration circuit 122 may transpose the 8×13 intermediate pixel matrix again, thereby obtaining a 13×8 pixel matrix. Then, the motion compensation acceleration circuit 122 may write the 13×8 pixel matrix into the motion compensation intermediate factor buffer 145. The same 8×4 transposition register array as described above can be used in the aforementioned two transposition steps. The motion compensation acceleration circuit 122 may read all of the integer reference pixels from the motion compensation intermediate factor register 145 8 times. All of the 13 integer reference pixels are read to the internal registers each time, and the integer reference pixels are interpolated by using an 8-pixel parallel linear filter, thereby obtaining 8 half pixels. The addition and clipping unit of the motion compensation acceleration circuit 122 may add the 8 interpolated half pixels to the residue values read from the residue macroblock buffer 141, and clip the summation to [0, 255], thereby obtaining an 8×8 reconstructed macroblock.

In another embodiment, there is only one case for subpixel diagonal interpolation in the VC-1 standard. That is, vertical interpolation is performed before horizontal interpolation. Before performing vertical interpolation, the motion compensation acceleration circuit 122 has to read an 11×11 pixel matrix from the motion compensation reference macroblock buffer 142 and transpose the 11×11 pixel matrix. The motion compensation acceleration circuit 122 may write the transposed 11×11 pixel matrix into the motion compensation intermediate factor buffer 145, and then the motion compensation acceleration circuit 122 may perform vertical interpolation, thereby obtaining an 8×11 intermediate pixel matrix. After performing vertical interpolation, the motion compensation acceleration circuit 122 may transpose the 8×11 intermediate pixel matrix, and write the 11×8 pixel matrix after transposition into the motion compensation intermediate factor buffer 145. Then, the motion compensation acceleration circuit 122 may read pixels from the motion compensation intermediate factor buffer 145 to perform horizontal interpolation.

Figure 10A:
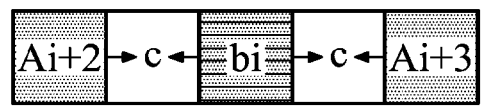
FIGS. 10A~10C are diagrams illustrating diagonal interpolation for motion compensation according to yet another embodiment of the invention.
Figure 10A:
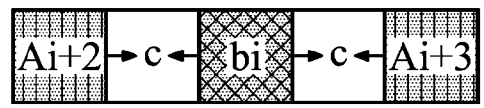
Figure 10A:
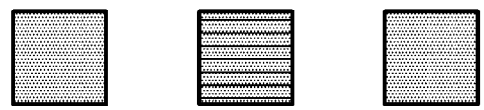
Figure 10B:
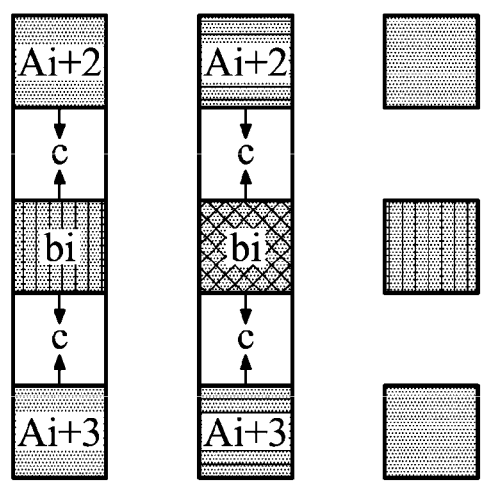
Figure 10C:
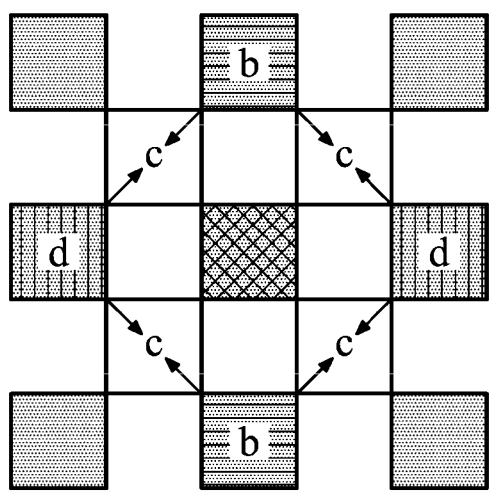

FIGS. 10A~10C are diagrams illustrating diagonal interpolation for motion compensation according to yet another embodiment of the invention. Interpolation of the quarter pixels and third quarter pixels for motion compensation in the H.264 standard can be calculated based on the interpolation values of the half pixels by using a bilinear filter. As illustrated in FIG. 10A, horizontal interpolation of a quarter pixel can be performed by calculating the average of the half pixel bi? and its horizontally adjacent integer pixels $A_{i+2}$ and $A_{i+3}$ when the fraction portion of the motion vector in the vertical direction is zero. Accordingly, the same circuit for calculating horizontal interpolation of the half pixels can be used to calculate horizontal interpolation of the quarter pixel c. When the fraction portion of the motion vector in the vertical direction is not zero, the quarter pixel c can be interpolated by calculating the average of the half pixels in the diagonal line and horizontally adjacent half pixels obtained by vertical interpolation. Therefore, the same circuit for performing diagonal interpolation of the half pixels (i.e. vertical interpolation is performed before horizontal interpolation) can be used to perform horizontal interpolation of the quarter pixels.

As illustrated in FIG. 10B, vertical interpolation of a quarter pixel c can be performed by calculating the average of the half pixel bi and its vertically adjacent integer pixels $A_{i+2}$ and $A_{i+3}$ when the fraction portion of the motion vector in the vertical direction is zero. Accordingly, the same circuit for performing vertical interpolation of the half pixels can be used to perform vertical interpolation of the quarter pixels. When the fraction portion of the motion vector in the vertical direction is not zero, the quarter pixel c can be interpolated by calculating the average of the half pixels in the diagonal line and vertically adjacent half pixels obtained by horizontal interpolation. Therefore, the same circuit for performing diagonal interpolation of the half pixels (i.e. horizontal interpolation is performed before vertical interpolation) can be used to perform vertical interpolation of the quarter pixels.

When the circuit for half-pixel interpolation is used to perform horizontal or vertical interpolation of the quarter pixels, the 8 half pixels $b_0$~$b_7$ obtained by a linear filter are not added to the residue values immediately. Meanwhile, data stored in registers $A_2$~$A_{10}$ are integer pixels or half pixels adjacent to the half pixels $b_0$~$b_7$. If interpolation of the quarter pixels is performed, the motion compensation acceleration circuit 122 may calculate the value $c_i=(b_i+A_{i+2}+1)>>1$ where $0 \leq i \leq 7$. If interpolation of the third quarter pixels is performed, the motion compensation acceleration circuit 122 may calculate the values $c_i=(b_i+A_{i+3}+1)>>1$ where $0 \leq i \leq 7$. Then, the addition and clipping unit of the motion compensation acceleration circuit 122 may add the values $c_0$~$c_7$ to the residue values, and clip the summation to [0, 255], thereby obtaining reconstructed macroblocks for motion compensation.

As illustrated in FIG. 10C, diagonal interpolation for a quarter pixel c can be performed by calculating the average of the half pixels after vertical interpolation and the adjacent half pixel b after horizontal interpolation in the diagonal direction. Accordingly, the circuit for calculating vertical interpolation of the half pixels is used to generate an 8×8 vertical half pixel matrix, and the motion compensation acceleration circuit 122 may transpose the vertical half pixel matrix and write the transposed vertical half pixel matrix into the motion compensation intermediate factor buffer 145. Then, the circuit for performing horizontal interpolation of the half pixels is used to generate horizontal half pixels. When eight horizontal half pixels in a row are obtained, eight corresponding vertical half pixels in a column are retrieved from the motion compensation intermediate factor buffer 145. Subsequently, the average value of each pair of corresponding pixels (i.e. a horizontal half pixel and a vertical half pixel) is calculated, thereby obtaining the quarter pixel c. Then, the addition and clipping unit of the motion compensation acceleration circuit 122 may add the quarter pixel c to the residue values, and clip the summation to [0,255], thereby obtaining the reconstructed pixels for motion compensation.

In another embodiment, the procedures of horizontal interpolation of the half pixels, quarter pixels, and third quarter pixels are the same in the VC-1 standard. The differences between the interpolation of the quarter pixels/third quarter pixels and bi-cubic interpolation of the half pixels are different coefficients in the 4-tap filter. Accordingly, different sub-pixel interpolation can be implemented by using the same circuit architecture with different filters.

D-2 Interpolation of the chrominance Macroblocks in the H.264 standard and Bilinear Interpolation in the VC-1 standard In the H.264 standard, precision of the chrominance interpolation values may be double precision of the luminance interpolation values. That is, the precision of the chrominance interpolation values can be one-eighth-pixel. The size of the chrominance macroblocks for motion compensation can be only one fourth of that of the luminance macroblocks. For example, when the size of a luminance macroblock is 8×8, the size of a corresponding chrominance macroblock is 4×4. Accordingly, there are four sizes, such as 8×8, 8×4, 4×8 and 4×4, for chrominance interpolation for motion compensation in the H.264 standard used in the motion compensation acceleration circuit 122 (i.e. hardware). The processing unit 110 may perform interpolation for luminance blocks having a size smaller than 8×8, and interpolation for chrominance blocks having a size smaller than 4×4.

Figure 11A:
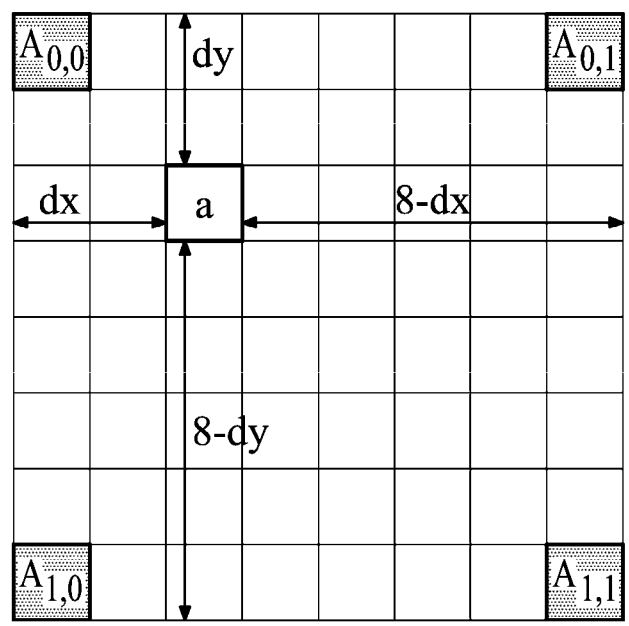
FIG. 11A is a diagram illustrating interpolation of a chrominance macroblock in the H.264 standard according to an embodiment of the invention.

FIG. 11A is a diagram illustrating interpolation of a chrominance macroblock in the H.264 standard according to an embodiment of the invention. As illustrated in FIG. 11A, the one-eighth pixel for chrominance interpolation is generated by linear interpolation of four adjacent integer pixels, where the formula of interpolation can be expressed as following:

$$c=((8-dx)(8-dy)*A_{0,0}+dx(8-dy)*A_{0,1}+(8-dx)dy*A_{1,0}+dxdy*A_{1,1}+32)>>6 \quad (9)$$

wherein $A_{0,0}$, $A_{0,1}$, $A_{1,0}$ and $A_{1,1}$ indicate four integer reference pixels, dx and dy indicate the offset values with a one-eight pixel as a unit in the horizontal direction and vertical direction, respectively, and the range of dx and dy is within [0, 7], and c indicates the one-eighth pixel generated by interpolation of four adjacent integer pixels.

Figure 11B:
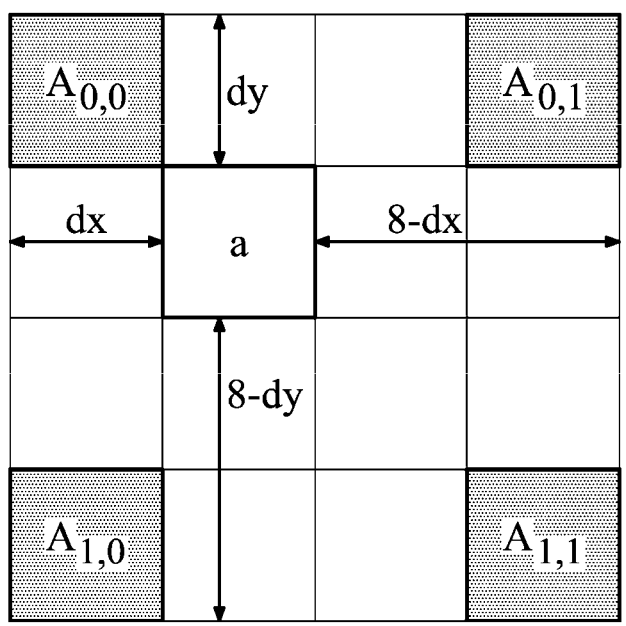
FIG. 11B is a diagram illustrating interpolation of a chrominance macroblock in the VC-1 standard according to an embodiment of the invention.
Figure 12A:
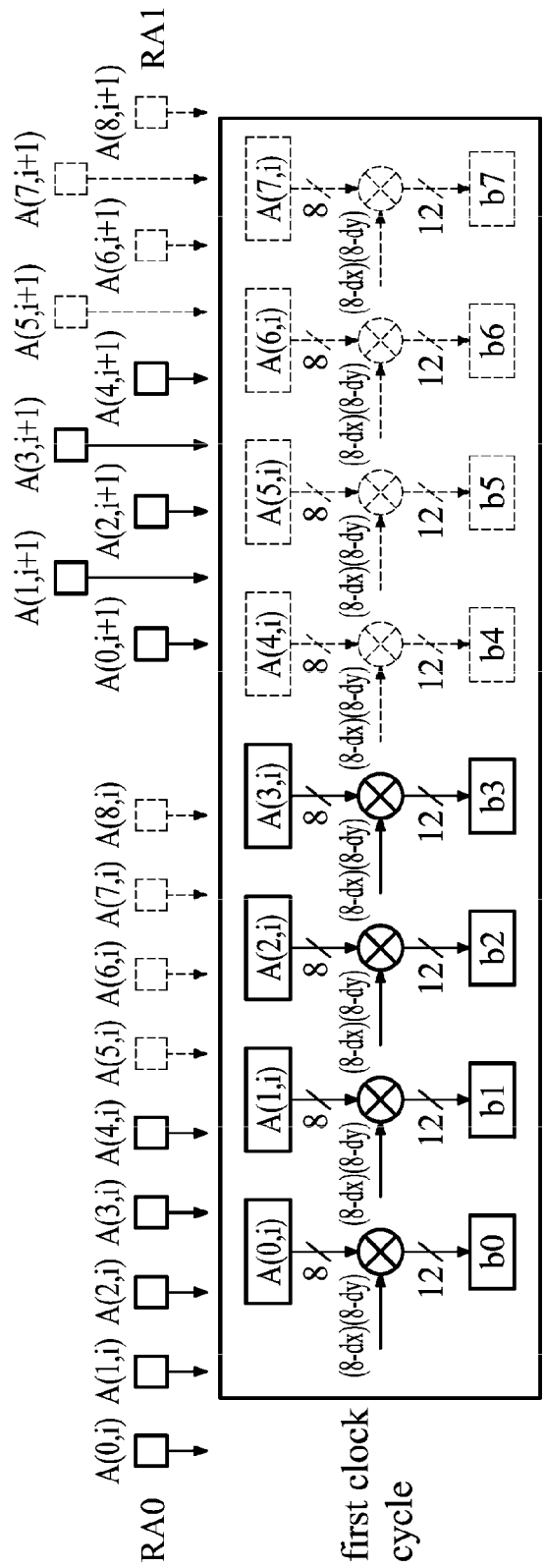
FIGS. 12A~12E are diagrams illustrating a filter for interpolation of a chrominance macroblock in the H.264 standard and bilinear interpolation in the VC-1 standard according to an embodiment of the invention.
Figure 12B:
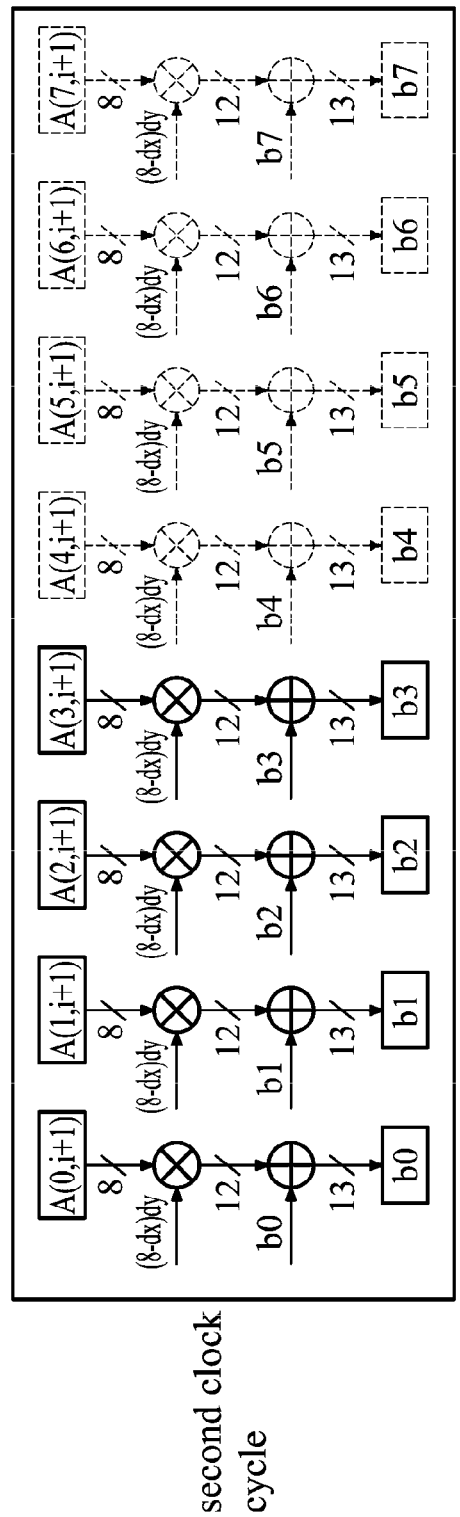
Figure 12C:
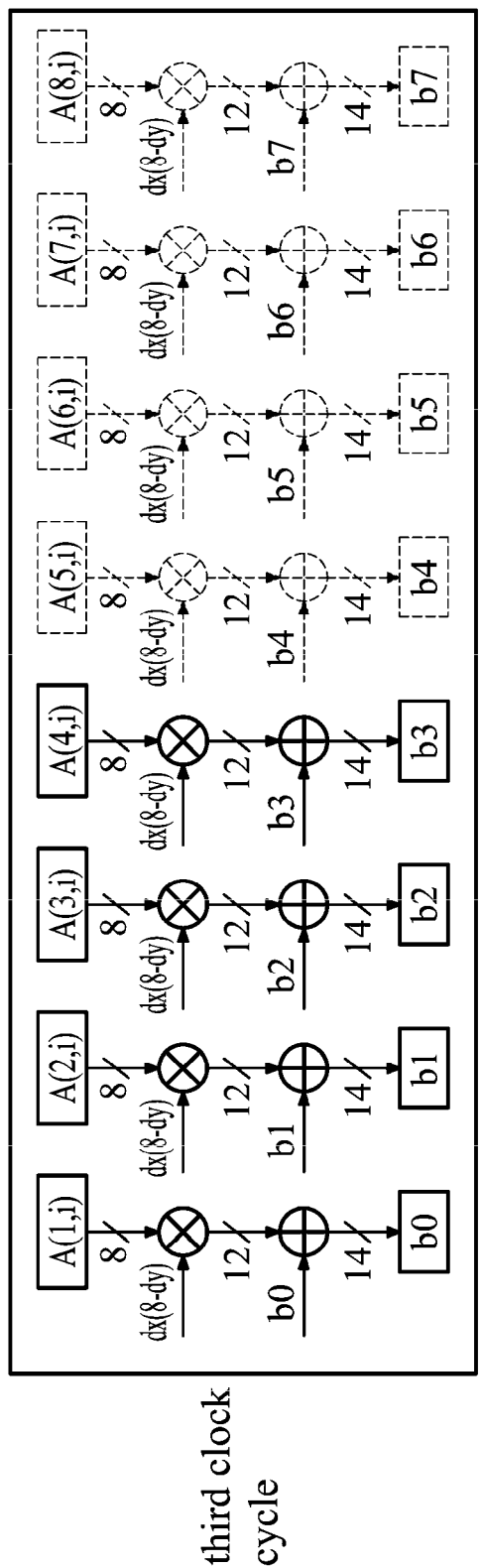
Figure 12D:
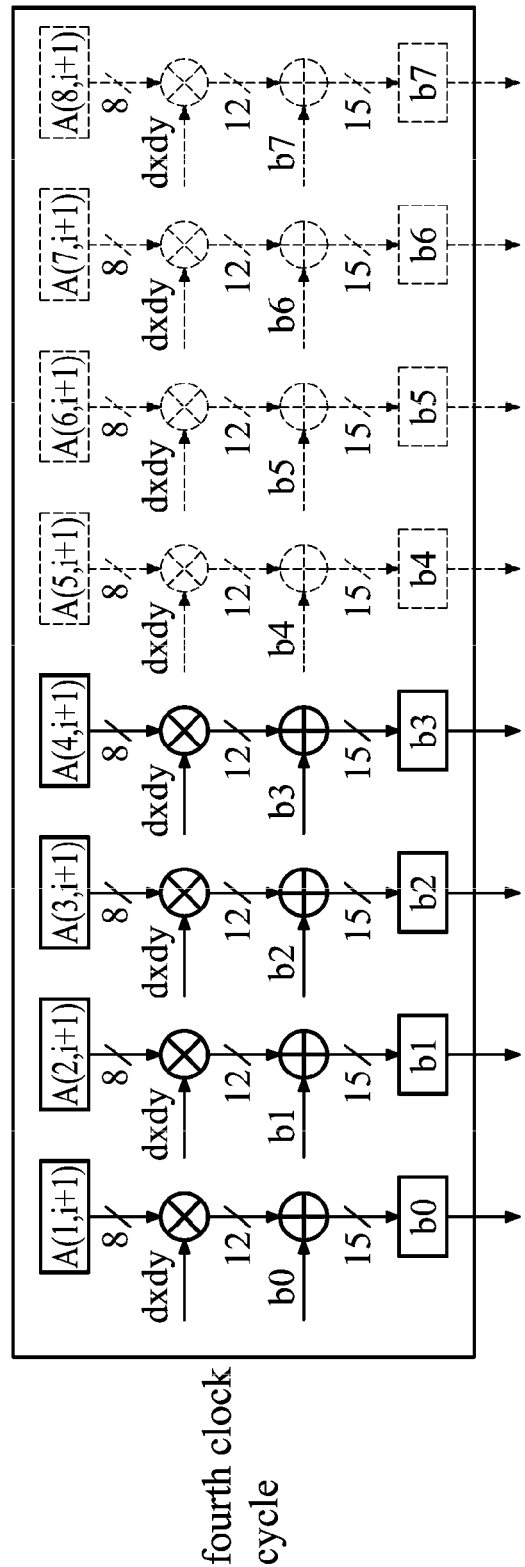
Figure 12E:
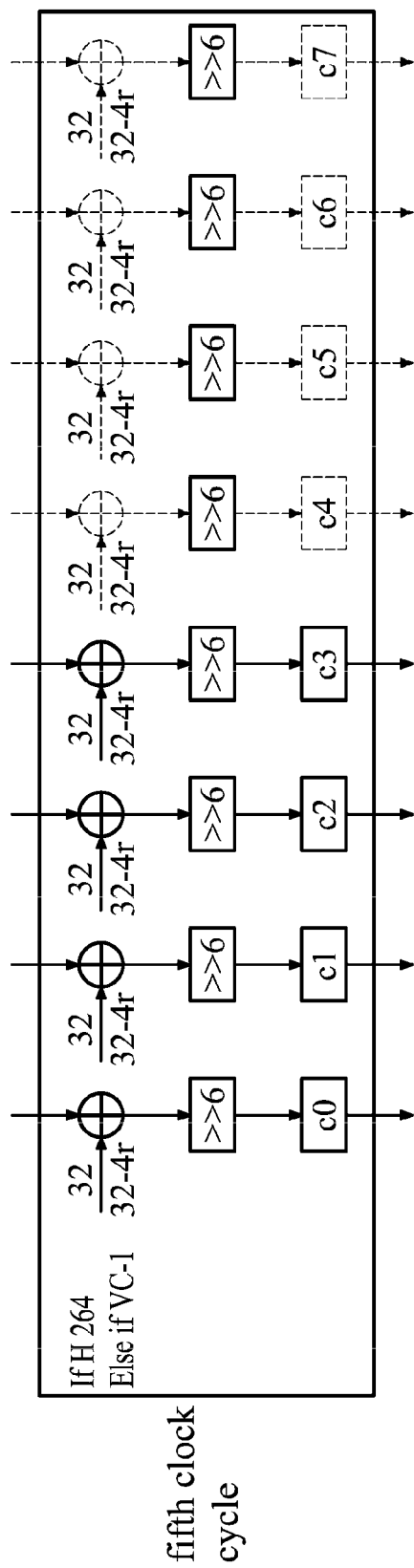

FIG. 11B is a diagram illustrating interpolation of a chrominance macroblock in the VC-1 standard according to an embodiment of the invention. In the VC-1 standard, the precision of a bilinear interpolation value may be a quarter pixel. The size of the luminance macroblocks is 16×16 and the size of the chrominance macroblocks is 8×8. As illustrated in FIG. 11B, the quarter pixel is generated by bilinear interpolation of four adjacent integer pixels, where the Bilinear Interpolation Formulas (9), (10), and (11) can be expressed as following:

$$c=((4-dx)(4-dy)*A_{0,0}+dx(4-dy)*A_{0,1}+(4-dx)dy*A_{1,0}+dxdy*A_{1,1}+8-r)>>4 \quad (9)$$

$$c=((8-2dx)(8-2dy)*A_{0,0}+2dx(8-2dy)*A_{0,1}+(8-2dx)*2dy*A_{1,0}+2dx*2dy*A_{1,1}+32-4r)>>6 \quad (10)$$

$$c=((8-dX)(8-dY)*A_{0,0}+dX(8-dY)*A_{0,1}+(8-dX)dY*A_{1,0}+dXdY*A_{1,1}+32-4r)>>6 \quad (11)$$

wherein dx and dy indicate the offset values with a quarter pixel as a unit in the horizontal direction and vertical direction, respectively, and the range of dx and dy is within [0, 3]. The Bilinear Interpolation Formula (10) can be rewritten into the Bilinear Interpolation Formula (11). If dX=2dx and dY=2dy are further defined in the Bilinear Interpolation Formula (11), then the Bilinear Interpolation Formula (11) can be replaced by the Bilinear Interpolation Formula (12). Referring to both the Bilinear Interpolation Formula (9) and (12), it should be appreciated that interpolation for chrominance macroblocks in the H.264 standard is the same with bilinear interpolation in the VC-1 standard, except for the rounding parameter r. Therefore, interpolation for chrominance macroblocks in the H.264 standard and bilinear interpolation in the VC-1 standard can be implemented by the same hardware circuit.

FIGS. 12A~12E are diagrams illustrating a filter for interpolation of a chrominance macroblock in the H.264 standard and bilinear interpolation in the VC-1 standard according to an embodiment of the invention. As illustrated in FIGS. 12A~12E, eight parallel linear filters are used in the motion compensation acceleration circuit 122 to perform interpolation of an 8×8 chrominance macroblock in the H.264 standard and bilinear interpolation in the VC-1 standard. Interpolation of a chrominance macroblock in the H.264 standard and bilinear interpolation in the VC-1 standard can be divided into 5 steps in the motion compensation acceleration circuit 122, thereby reducing delay time of critical paths. Further, five clock cycles are needed to perform interpolation of a chrominance macroblock in the H.264 standard and bilinear interpolation in the VC-1 standard, and only one multiplication operation is performed in each clock cycle. For example, during the first clock cycle, intermediate values $b_i=(8-dx)(8-dy)*A_{i,0}$ ($0 \le i \le 7$) are calculated. During the second clock cycle, intermediate values $b_i=dx(8-dy)*A_{i,1}+b_i$ are calculated. During the third clock cycle, intermediate values $b_i=(8-dx)dy*A_{i+1,0}+b_i$ are calculated. During the fourth clock cycle, intermediate values $b_i=dxdy*A_{i+1,1}+b_i$ are calculated. During the fifth clock cycle, one-eighth pixels $c_i=(b_i+32)>>6$ ($0 \le i \le 7$) are calculated when performing interpolation of the chrominance macroblocks in the H.264 standard, and quarter pixels $c_i=(b_i+32-4r)>>6$ ($0 \le i \le 7$) are calculated when performing bilinear interpolation in the VC-1 standard. Accordingly, interpolation of eight sub-pixels in a row can be completed in 5 clock cycles in the motion compensation acceleration circuit 122. Further, the motion compensation acceleration circuit 122 may read eight residue values in a row from the residue macroblock buffer 141, add the residue values to eight sub-pixels, and clip the summation to [0, 255], thereby reconstructing eight pixels in a row. The aforementioned steps can be performed repeatedly for 8 times, thereby implementing motion compensation for 8×8 chrominance macroblocks in the H.264 standard, and bilinear interpolation of motion compensation for 8×8 chrominance macroblocks in the VC-1 standard.

In the VC-1 standard, motion compensation for a 16×16 luminance macroblock can be implemented by performing bilinear interpolation of an 8×8 luminance macroblock for 4 times. In the H.264 standard, motion compensation for an 8×4 chrominance macroblock can be implemented by using the eight-pixel parallel linear filter repeatedly for 4 times. In other words, the interpolation for an 8×4 chrominance macroblock can be completed by interpolation of one-eighth chrominance pixels in four rows. Regarding motion compensation for a 4×8 or 4×4 chrominance macroblock, four of the eight parallel linear filters can be disabled. In other words, four active parallel linear filters can be used for interpolation of a 4×8 or 4×4 chrominance macroblock.

It should be noted that eight parallel linear filters are used in the motion compensation acceleration circuit 122 for implementing interpolation of the half pixels and quarter pixels in an 8×8 macroblock in the H.264 standard and the VC-1 standard. Further, the motion compensation acceleration circuit 122 may use a 32×16 bit transposition register array, which can be repeatedly used in different interpolation modes, such as horizontal interpolation, vertical interpolation and diagonal interpolation. Interpolation of an 8×8 macroblock can be performed for several times in the motion compensation acceleration circuit 122, thereby implementing interpolation of macroblocks with a larger size, such as 16×16, 16×8 and 8×16 macroblocks.

Figure 13:
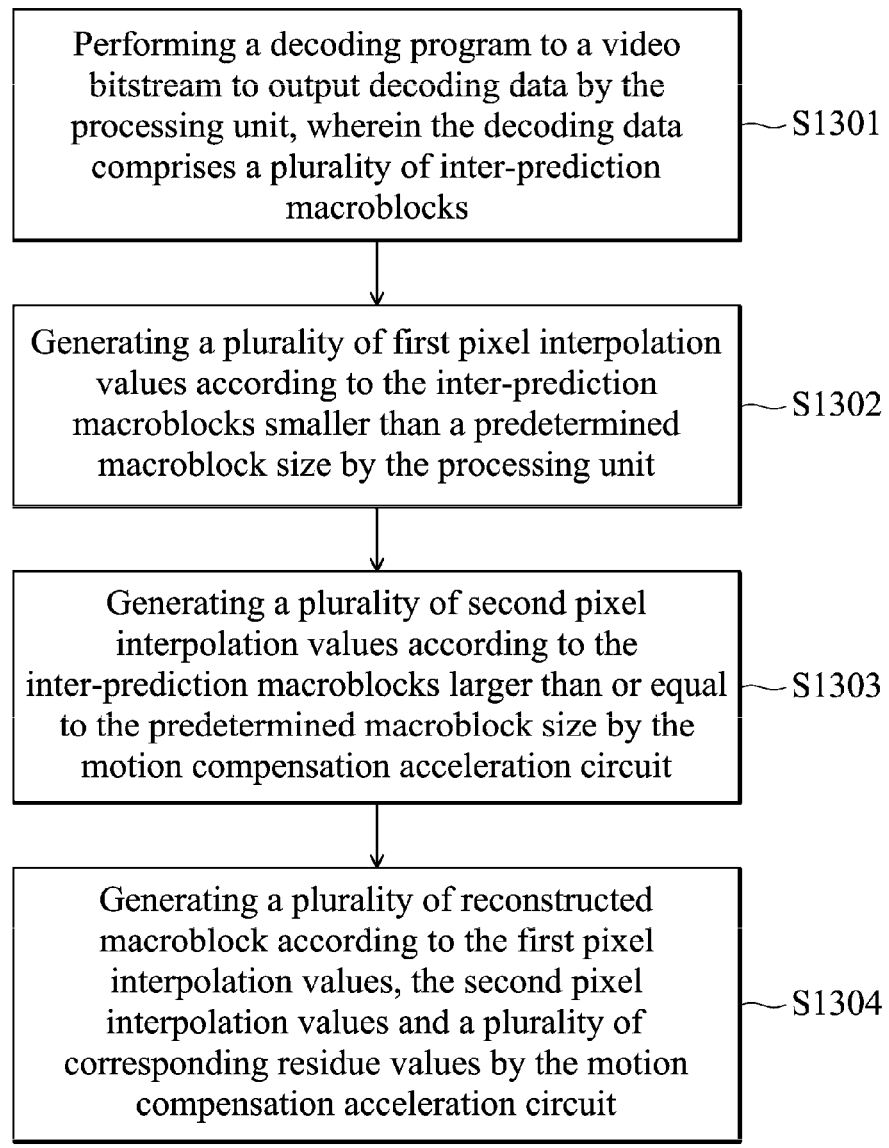
FIG. 13 is a flow chart illustrating a motion compensation method according to an embodiment of the invention.

FIG. 13 is a flow chart illustrating a motion compensation method according to an embodiment of the invention. In step S1301, the processing unit 110 is utilized to perform a decoding program to decode a video bitstream, thereby outputting decoding data, wherein the decoding data comprises a plurality of inter-prediction macroblocks. In addition, the processing unit 110 may execute the entropy decoding program and decoding parameter calculating program before performing motion compensation. In step S1302. The processing unit 110 may generate a plurality of first pixel interpolation values according to the inter-prediction macroblocks which are smaller than a predetermined macroblock size. In step S1303, the motion compensation acceleration circuit 122 may generate a plurality of second pixel interpolation values according to the inter-prediction macroblocks which are larger than or equal to the predetermined macroblock size. In step S1304, the motion compensation acceleration circuit 122 may generate a plurality of reconstructed macroblocks according the first pixel interpolation values, the second pixel interpolation values and a plurality of residue values thereof.

For those skilled in the art, it should be appreciated that the motion compensation acceleration circuit 122 can be applied in a video decoding system combining software and hardware (e.g. a CPU and a hardware acceleration unit). Specifically, the processing unit 110 is used to perform motion compensation for macroblocks with a smaller macroblock size, and the processing unit 110 is capable of performing real-time video decoding to the 480i (e.g. D1 format) images in the H.264/AVC (Baseline Profile) standard and the VC-1 (Simple Profile/Main Profile) standard with a low operating frequency and low power consumption. In addition, the implementation and the hardware architecture of the invention are not limited to the decoding process of the aforementioned video codec standards, and the invention can be applied to other video codec algorithms or standards, such as the MPEG-4 standard or the Real Video standard. The motion compensation acceleration circuit 122 of the invention may optimize the flow of the linear filters, thereby reducing time delay of critical paths. Accordingly, when the system frequency and bandwidth increases, the invention can also be used to perform a video decoding process to images with a higher resolution and a higher frame rate.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device for motion compensation, comprising:
    a hardware processor configured to:
        perform a decoding program on a video bitstream to output decoding data, wherein the decoding data comprises a plurality of inter-prediction macroblocks, and
        generate a plurality of first pixel interpolation values with each of the plurality of the first pixel interpolation values being generated based on the inter-prediction macroblocks which are smaller than a predetermined macroblock size; and
    a motion compensation acceleration circuit separate from the hardware processor, the motion compensation acceleration circuit comprising a plurality of individual parallel linear filters configured to perform a motion compensation process to generate a plurality of second pixel interpolation values, the motion compensation acceleration circuit being configured to:
        receive the first pixel interpolation values from the hardware processor,
        generate the plurality of second pixel interpolation values, each of the plurality of the second pixel interpolation values being generated based on the inter-prediction macroblocks having sizes larger than or equal to the predetermined macroblock size, wherein the motion compensation process comprises three to five clock cycles, a number of the clock cycles being dependent on a pixel precision or a macroblock size, and the clock cycles being defined by a series of successive phases that calculate intermediate prediction values to generate the plurality of second pixel interpolation values, and
        generate a plurality of reconstructed macroblocks with each reconstructed macroblock being generated based on: the first pixel interpolation values, the second pixel interpolation values, and a plurality of corresponding residue values.

2. The electronic device as claimed in claim 1, wherein the video bitstream is encoded according to H.264 standard or VC-1 standard.

3. The electronic device as claimed in claim 2, wherein the predetermined macroblock size is 8×8 bits.

4. The electronic device as claimed in claim 1, wherein the hardware processor is further configured to store the first pixel interpolation values in a motion compensation reference macroblock buffer, and the motion compensation acceleration circuit is configured to read the first pixel interpolation values from the motion compensation reference macroblock buffer, and generate the reconstructed macroblocks by adding the first pixel interpolation values, the second interpolation values and the corresponding residue values.

5. The electronic device as claimed in claim 1, wherein the decoding program executed by the hardware processor further comprises an entropy decoding program and a decoding parameter calculating program.

6. The electronic device as claimed in claim 1, wherein the motion compensation acceleration circuit is further configured to divide the inter-prediction macroblocks having sizes larger than the predetermined macroblock size into a plurality of sub-macroblocks which match the predetermined macroblock size.

7. The electronic device as claimed in claim 6, the motion compensation process being performed on the inter-prediction macroblocks or the sub-macroblocks matching the predetermined macroblock size.

8. The electronic device as claimed in claim 7, wherein the motion compensation process performed on the inter-prediction macroblocks is a horizontal pixel interpolation process, a vertical pixel interpolation process or a diagonal pixel interpolation process, and the linear filters are configured to perform the horizontal pixel interpolation process, and the motion compensation acceleration circuit further comprises a transposition register array configured to perform transposition of the inter-prediction macroblocks, so that the linear filters are further configured to perform the vertical pixel interpolation process or the diagonal pixel interpolation process.

9. The electronic device as claimed in claim 7, wherein the motion compensation reference macroblock buffer is a ping-pong buffer configured to store a plurality of reference macroblocks in the video bitstream, and the hardware processor is further configured to write the reference macroblocks to the motion compensation reference macroblock buffer and read the reference macroblocks from the motion compensation reference macroblock buffer simultaneously.

10. A motion compensation method applied in an electronic device comprising a hardware processor and a motion compensation acceleration circuit separate from the hardware processor, the motion compensation acceleration circuit comprising a plurality of individual parallel filters configured to perform a motion compensation process to generate a plurality of second pixel interpolation values, the method comprising:

performing a decoding program on a video bitstream to output decoding data by the hardware processor, wherein the decoding data comprises a plurality of inter-prediction macroblocks;

generating a plurality of first pixel interpolation values with each of the plurality of the first pixel interpolation values being generated based on the inter-prediction macroblocks which are smaller than a predetermined macroblock size by the hardware processor;

generating the plurality of second pixel interpolation values, each of the plurality of the second pixel interpolation values being generated based on the inter-prediction macroblocks having sizes larger than or equal to the predetermined macroblock size by the motion compensation acceleration circuit, wherein the motion compensation process comprises three to five clock cycles, a number of the clock cycles being dependent on a pixel precision or a macroblock size, and the clock cycles being defined by a series of successive phases that calculate intermediate prediction values to generate the plurality of second pixel interpolation values; and generating, by the motion compensation acceleration circuit, a plurality of reconstructed macroblocks with each reconstructed macroblock being generated based on: the first pixel interpolation values, the second pixel interpolation values and a plurality of corresponding residue values.

11. The motion compensation method as claimed in claim 10, wherein the video bitstream is encoded according to H.264 standard or VC-1 standard.

12. The motion compensation method as claimed in claim 10, wherein the predetermined macroblock size is 8×8 bits.

13. The motion compensation method as claimed in claim 10, further comprising:

storing the first pixel interpolation values in a motion compensation reference macroblock buffer by the hardware processor;

reading the first pixel interpolation values from the motion compensation reference macroblock buffer by the motion compensation acceleration circuit; and adding, by the motion compensation acceleration circuit, the first pixel interpolation values, the second pixel interpolation values, and the corresponding residue values to generate the reconstructed macroblocks.

14. The motion compensation method as claimed in claim 10, wherein the decoding program executed by the hardware processor further comprises an entropy decoding program and a decoding parameter calculating program.

15. The motion compensation method as claimed in claim 10, further comprising:

dividing the inter-prediction macroblocks having sizes larger than the predetermined macroblock size into a plurality of sub-macroblocks which match the predetermined macroblock size by the motion compensation acceleration circuit.

16. The motion compensation method as claimed in claim 15, the motion compensation process being performed on the inter-prediction macroblocks or the sub-macroblocks matching the predetermined macroblock size.

17. The motion compensation method as claimed in claim 16, wherein the motion compensation process performed on the inter-prediction macroblocks is a horizontal pixel interpolation process, a vertical pixel interpolation process or a diagonal pixel interpolation process, and the linear filters are configured to perform the horizontal pixel interpolation process, and the motion compensation acceleration circuit further comprising a transposition register array configured to perform transposition of the inter-prediction macroblocks, so that the linear filters are further configured to perform the vertical pixel interpolation process or the diagonal pixel interpolation process.

18. The motion compensation method as claimed in claim 16, wherein the motion compensation reference macroblock buffer is a ping-pong buffer configured to store a plurality of reference macroblocks in the video bitstream, and the method further comprising:

writing the reference macroblocks to the motion compensation reference macroblock buffer and reading the reference macroblocks from the motion compensation reference macroblock buffer by the processing unit simultaneously.

19. The electronic device as claimed in claim 1, wherein the motion compensation process is performed in three clock cycles.

20. The electronic device as claimed in claim 1, wherein the motion compensation process is performed in four clock cycles.

* * * * *